United States Patent
Meng et al.

(10) Patent No.: US 11,888,744 B2
(45) Date of Patent: Jan. 30, 2024

(54) SPIN-LEAF NETWORK CONGESTION CONTROL METHOD, NODE, SYSTEM, AND STORAGE MEDIUM

(71) Applicant: HUAWEI TECHNOLOGIES CO., LTD., Shenzhen (CN)

(72) Inventors: Ke Meng, Nanjing (CN); Hewen Zheng, Nanjing (CN); Haonan Ye, Nanjing (CN); Weiqing Kong, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 17/696,643

(22) Filed: Mar. 16, 2022

(65) Prior Publication Data

US 2022/0210071 A1  Jun. 30, 2022

Related U.S. Application Data

(63) Continuation of application No. PCT/CN2020/115665, filed on Sep. 16, 2020.

(30) Foreign Application Priority Data

Sep. 16, 2019 (CN) .......................... 201910874378.7

(51) Int. Cl.
*H04L 47/122* (2022.01)
*H04L 41/12* (2022.01)
(Continued)

(52) U.S. Cl.
CPC ............ *H04L 47/122* (2013.01); *H04L 41/12* (2013.01); *H04L 47/125* (2013.01); *H04L 47/29* (2013.01); *H04L 47/829* (2013.01)

(58) Field of Classification Search
CPC ..... H04L 47/122; H04L 41/12; H04L 47/125; H04L 47/29; H04L 47/829; H04L 47/127;
(Continued)

(56) References Cited

U.S. PATENT DOCUMENTS 10,374,956 B1 * 8/2019 Tracy .................. H04L 41/0816
2014/0376373 A1 12/2014 Deshpande et al.
(Continued)

FOREIGN PATENT DOCUMENTS

CN  103414650 A  11/2013
CN  106911584 A  6/2017
(Continued)

OTHER PUBLICATIONS

Ting, "Traffic Congestion Study in Data Center Networks," No. 11, Sum 180, total 1 page (2017). With English abstract.
(Continued)

*Primary Examiner* — Tonia L Dollinger
*Assistant Examiner* — Joseph M Cousins
(74) *Attorney, Agent, or Firm* — Leydig, Voit & Mayer, Ltd.

(57) ABSTRACT

A network congestion control method, a node and a system are disclosed, where the method is applied to a spine-leaf network system. The method includes: a spine node receives network information sent by the at least one leaf node, where the network information includes network topology information of the leaf node and a network performance indicator of the leaf node; networks the at least one leaf node and the spine node based on the network topology information of the at least one leaf node, to obtain a combined network topology; and if the combined network topology is a global network topology of the spine-leaf network system, per-
(Continued)

forms network congestion control on the at least one leaf node based on the network performance indicator of the at least one leaf node.

12 Claims, 16 Drawing Sheets

(51) Int. Cl.
*H04L 47/125* (2022.01)
*H04L 47/70* (2022.01)
*H04L 47/10* (2022.01)

(58) Field of Classification Search
CPC . H04L 43/0817; H04L 43/0852; H04L 45/02; H04L 47/11; H04L 49/1515; H04L 41/145; H04L 41/5009; H04L 45/48; H04L 47/24; H04L 47/31; H04L 41/0823
See application file for complete search history.

(56) References Cited

U.S. PATENT DOCUMENTS

| | | | |
|---|---|---|---|
| 2017/0054641 A1* | 2/2017 | Anerousis | H04W 24/08 |
| 2018/0309636 A1 | 10/2018 | Strom et al. | |
| 2020/0120029 A1* | 4/2020 | Sankaran | H04L 45/38 |
| 2020/0220803 A1* | 7/2020 | Zheng | H04L 45/123 |
| 2021/0119910 A1* | 4/2021 | Chen | H04L 45/02 |

FOREIGN PATENT DOCUMENTS

| | | |
|---|---|---|
| CN | 109510768 A | 3/2019 |
| CN | 109802879 A | 5/2019 |
| CN | 110022264 A | 7/2019 |
| WO | 2018222427 A1 | 12/2018 |

OTHER PUBLICATIONS

K. Ramakrishnan et al., "The Addition of Explicit Congestion Notification (ECN) to IP," RFC: 3168, total 63 pages (Sep. 2001).

* cited by examiner

SPIN-LEAF NETWORK CONGESTION CONTROL METHOD, NODE, SYSTEM, AND STORAGE MEDIUM

CROSS-REFERENCE TO RELATED APPLICATIONS

This application is a continuation of International Application PCT/CN2020/115665, filed on Sep. 16, 2020, which claims priority to Chinese Patent Application No. 201910874378.7, filed on Sep. 16, 2019. The disclosures of the aforementioned applications are hereby incorporated by reference in their entireties.

TECHNICAL FIELD

This application relates to the field of communication technologies, and in particular, to a network congestion control method, a node, a system, and a computer storage medium.

BACKGROUND

A modern data center (DC) network has increasingly high requirements on a low latency, a high throughput, and other features. For example, in services such as cloud storage, because of a high concurrency feature of service operations, a data center network has a massive quantity of concurrent data flows (that is, packets), which are prone to cause network congestion, resulting in issues such as a high packet transmission latency, a low throughput, and relatively high network resource consumption. Currently, the data center network uses a data center quantized congestion notification (DCQCN) algorithm to implement network congestion control. FIG. 1 is a schematic diagram of a DCQCN-based congestion control scene. As shown in FIG. 1, a switch (which may also be referred to as a congestion node or a congestion point) receives a packet sent by a transmit-end device (which may also be referred to as a source node or a send point), and stores the packet in a form of a queue, which is referred to as a packet queue. The switch makes an explicit congestion notification (ECN) marking on a transmission packet in the packet queue based on a length of the packet queue, so that the transmission packet carries an ECN flag, which is used to indicate that network congestion occurs on the switch. Correspondingly, the switch forwards the transmission packet in the packet queue to a receive-end device (which may also be referred to as a target node or a receive point). After detecting that the transmission packet carries the ECN flag, the receive-end device returns a congestion notification packet (CNP) to the transmit-end device, to notify the transmit-end device to adjust a packet sending rate, to mitigate network congestion.

However, it is discovered during practice that network traffic in the data center network changes dynamically, in other words, changes with time. If the foregoing DCQCN-based congestion control solution is still used, network performance is affected, failing to meet performance requirements such as a low latency and a high throughput on a network.

SUMMARY

Embodiments of this application disclose a network congestion control method, a node, a system, and a storage medium, which can be used to resolve a problem that an existing DCQCN-based network congestion control solution cannot meet network performance requirements such as a low latency and a high throughput because network traffic changes dynamically.

According to a first aspect, an embodiment of this application discloses a network congestion control method, applied to a spine-leaf network system. The system includes a spine node and at least one leaf node that communicates with the spine node. The method includes: The spine node receives network information sent by the at least one leaf node, where the network information includes network topology information of the leaf node and a network performance indicator of the leaf node. For example, the spine node may periodically receive network information collected and sent by the leaf node. Further, the spine node networks the at least one leaf node and the spine node based on the network topology information of the at least one leaf node, to obtain a combined network topology. If the combined network topology is a global network topology of the spine-leaf network system, network congestion control is performed on the at least one leaf node based on the network performance indicator of the at least one leaf node.

By implementing this embodiment of this application, network traffic variation of each leaf node in the spine-leaf network system can be reflected based on the network performance indicator of the leaf node, thereby implementing network congestion control for each leaf node in the system based on the network performance indicator of the corresponding leaf node. This can resolve a problem that DCQCN-based network congestion control in a conventional technology cannot meet network performance requirements such as a high throughput and a low latency imposed by network transmission because network traffic changes dynamically. This is favorable for meeting the network performance requirements such as a high throughput and a low latency imposed by network transmission and favorable for improving reliability of network congestion control.

With reference to the first aspect, in some possible embodiments, the spine node calls a scene recognition model to process a target performance indicator, to obtain a network traffic scene corresponding to the at least one leaf node. The target performance indicator is the network performance indicator of the at least one leaf node or a network performance indicator obtained by preprocessing the network performance indicator of the at least one leaf node. The scene recognition model is obtained through training in advance based on an initial network performance indicator and an initial traffic scene of each node in the spine-leaf network system. The spine node may further perform network congestion control on the at least one leaf node based on the network traffic scene.

By implementing this step, the spine node may call the scene recognition model to process a target performance indicator in a previous period (for example, a network performance indicator of the at least one leaf node in the previous period), to predict a current network traffic scene of the spine-leaf network system, so that network congestion control is performed on one or more leaf nodes based on the network traffic scene. This is favorable for adapting to a scene in which network traffic changes dynamically, thereby resolving the problem that the existing DCQCN-based network congestion control solution cannot meet the network performance requirements such as a high throughput and a low latency imposed by network transmission because network traffic changes dynamically.

With reference to the first aspect, in some possible embodiments, a scene control table is maintained in the spine node. The spine node obtains the scene control table, where the scene control table records a mapping relationship between a scene and congestion control information, and the mapping relationship is that the congestion control information corresponds to at least one scene. The spine node queries the scene control table for target control information corresponding to the network traffic scene, and then sends the target control information to the at least one leaf node, so that the leaf node performs network congestion control on the leaf node based on the target control information.

By implementing this step, the scene control table is maintained at a spine node side. This is convenient for unified management of the congestion control information. Then, the target control information corresponding to the network traffic scene is obtained from the scene control table and delivered to the leaf node for performing corresponding network congestion control. This is favorable for improving convenience of network congestion control. With reference to the first aspect, in some possible embodiments, a scene control table is maintained in each leaf node. The spine node sends the network traffic scene to the at least one leaf node. Correspondingly, the leaf node obtains the scene control table, where the scene control table records a mapping relationship between a scene and congestion control information, and the mapping relationship is that the congestion control information corresponds to at least one scene. The leaf node queries the scene control table for target control information corresponding to the network traffic scene, and performs network congestion control on the leaf node based on the target control information.

By implementing this step, the scene control table is maintained at a leaf node side. This is favorable for lightening load of the spine node and saving storage resources of the spine node, and also further improves processing efficiency of the spine node.

With reference to the first aspect, in some possible embodiments, if the network performance indicator includes a quantity of explicit congestion notification ECN packets transmitted by the leaf node in a previous period, the target control information may be an ECN marking waterline, including a target ECN marking parameter, which is used to reflect a slope by which an ECN marking probability varies with a packet queue length. The ECN marking probability is a probability that an ECN marking is made on a transmission packet in a packet queue of the leaf node, and the packet queue length is a length of the packet queue of the leaf node. Correspondingly, the at least one leaf node may obtain, through calculation based on the target ECN marking parameter and a length of a packet queue of each of the at least one leaf node, a target ECN marking probability corresponding to the at least one leaf node; and then make an ECN marking on the transmission packet in the packet queue of the at least one leaf node based on the corresponding target ECN marking probability, to notify a source node that communicates with the leaf node to reduce a packet transmission rate or stop packet transmission.

By implementing this step, the spine node delivers the target ECN marking parameter (that is, a target ECN marking waterline) to each leaf node. The leaf node obtains the target ECN marking probability through calculation based on the parameter and a packet queue length of the node at a current moment, so as to perform corresponding network congestion control based on the target ECN marking probability. In this way, corresponding target ECN marking probabilities may be obtained based on packet queue lengths of the leaf node at different moments, to accurately and reliably implement network congestion control on the leaf node. This is favorable for improving accuracy and reliability of network congestion control.

With reference to the first aspect, in some possible embodiments, if the network performance indicator includes a quantity of explicit congestion notification ECN packets transmitted by the leaf node in a previous period, the target control information includes a target ECN marking probability, which is used to indicate a probability that an ECN marking is made on a transmission packet in a packet queue of the leaf node. Correspondingly, the at least one leaf node makes an ECN marking on the transmission packet in the packet queue of the at least one leaf node based on the target ECN marking probability corresponding to the at least one leaf node, to notify a source node that communicates with the at least one leaf node to reduce a packet transmission rate or stop packet transmission.

By implementing this step, without considering accuracy of network congestion control, the spine node may directly obtain, through calculation based on the scene recognition model, the target ECN marking probability corresponding to the at least one leaf node and send the target ECN marking probability to the leaf node, so that network congestion control is performed based on the target ECN marking probability. This is favorable for lightening calculation load of the leaf node and improving efficiency of network congestion control on the leaf node.

With reference to the first aspect, in some possible embodiments, if the network performance indicator includes a quantity of priority-based flow control PFC packets transmitted by the leaf node in a previous period, the target control information includes a target PFC feedback parameter, which is used to reflect how a PFC notification message sent by the leaf node varies with a length of a packet queue of the leaf node. If the length of the packet queue of the at least one leaf node is greater than or equal to a first parameter threshold in the target PFC feedback parameter, the at least one leaf node sends a first PFC notification message to a source node that communicates with the at least one leaf node, to notify the source node to stop transmitting a priority packet indicated by the first PFC notification message. Alternatively, if the length of the packet queue of the at least one leaf node is less than or equal to a second parameter threshold in the target PFC feedback parameter, the at least one leaf node sends a second PFC notification message to a source node that communicates with the at least one leaf node, to notify the source node to continue transmitting a priority packet indicated by the second PFC notification message.

By implementing this step, the spine node delivers the target PFC feedback parameter (that is, a target PFC feedback waterline) to each leaf node, so that the leaf node determines, in real time based on the parameter and a packet queue length of the node at a current moment, whether the source node that communicates with the at least one leaf node is currently allowed to transmit a corresponding priority packet, thereby effectively and accurately controlling or mitigating network congestion of the at least one leaf node. This is favorable for improving accuracy and reliability of network congestion control.

With reference to the first aspect, in some possible embodiments, if the network performance indicator includes a quantity of priority-based flow control PFC packets transmitted by the leaf node in a previous period, the target control information is PFC feedback control information, which is used to indicate whether a source node that communicates with the leaf node is allowed to transmit a priority packet indicated by the PFC feedback control information.

If the PFC feedback control information is used to indicate that transmission of the priority packet indicated by the PFC feedback control information is not allowed, the at least one leaf node sends a first PFC notification message to the source node that communicates with the at least one leaf node, where the first PFC notification message is used to notify the source node to stop transmitting a priority packet indicated by the first PFC notification message. Alternatively, if the PFC feedback control information is used to indicate that transmission of the priority packet indicated by the PFC feedback control information is allowed, the at least one leaf node sends a second PFC notification message to the source node that communicates with the at least one leaf node, where the second PFC notification message is used to notify the source node that the source node is allowed to transmit a priority packet indicated by the second PFC notification message.

By implementing this step, without considering accuracy of network congestion control, the spine node may directly obtain the PFC feedback control information by using the scene recognition model, where the PFC feedback control information is used to indicate whether the source node that communicates with the at least one leaf node is allowed to transmit the corresponding priority packet; and then deliver the PFC feedback control information to the at least one leaf node, to implement network congestion control on the leaf node. This is favorable for reducing a processing process of the leaf node and improving efficiency of network congestion control on the leaf node.

With reference to the first aspect, in some possible embodiments, the network topology information is used to indicate that a neighboring node exists in a communication radius of the node. The spine node determines, based on the network topology information of the at least one leaf node and network topology information of the spine node, whether all neighboring nodes of each node in the spine-leaf network system are located in the combined network topology; and when all the neighboring nodes of each node are located in the combined network topology, determines that the combined network topology is the global network topology of the spine-leaf network system.

By implementing this step, the spine node may recognize, based on the neighboring node of each node in the spine-leaf network system, whether the combined network topology is the global network topology. This is convenient for subsequently performing network congestion control on the at least one leaf node based on the network performance indicator of each leaf node in the global network topology, thereby improving a generalization capability of system networking, supporting dynamic variation of a system network topology, and improving convenience of global network topology recognition.

According to a second aspect, an embodiment of this application provides a spine node. The node includes a function component, for example, a module or a unit, for performing the method according to any one of the first aspect or the possible implementations of the first aspect.

According to a third aspect, an embodiment of this application provides a spine node. The node includes a processor, a memory, a communication interface, and a bus. The processor, the communication interface, and the memory communicate with each other by using the bus. The communication interface is configured to receive and send data. The memory is configured to store instructions. The processor is configured to call the instructions in the memory, to perform the method according to any one of the first aspect or the possible implementations of the first aspect.

According to a fourth aspect, an embodiment of this application provides a spine-leaf network system, including a spine node and at least one leaf node that communicates with the spine node.

The at least one leaf node is separately configured to send network information of the at least one leaf node to the spine node.

The spine node is configured to: receive the network information sent by the at least one leaf node, where the network information includes network topology information of the leaf node and a network performance indicator of the leaf node; network the at least one leaf node and the spine node based on the network topology information of the at least one leaf node, to obtain a combined network topology; and if the combined network topology is a global network topology of the spine-leaf network system, perform network congestion control on the at least one leaf node based on the network performance indicator of the at least one leaf node.

For details about content that is not shown or described in this application, refer to content described in the first aspect. Details are not described herein again.

According to a fifth aspect, a computer-readable storage medium is provided. The computer-readable storage medium stores program code for network congestion control. The program code includes instructions used to perform the method according to any one of the first aspect or the possible implementations of the first aspect.

According to a sixth aspect, a chip product is provided, to perform the method according to any one of the first aspect or the possible implementations of the first aspect.

Based on the implementations provided in the foregoing aspects, this application may further provide more implementations through further combination.

BRIEF DESCRIPTION OF DRAWINGS

To describe the technical solutions in the embodiments of this application or in a conventional technology more clearly, the following briefly describes the accompanying drawings used in describing the embodiments or the conventional technology.

DESCRIPTION OF EMBODIMENTS

The following describes in detail the technical solutions in the embodiments of this application with reference to the accompanying drawings in this application.

Figure 1:
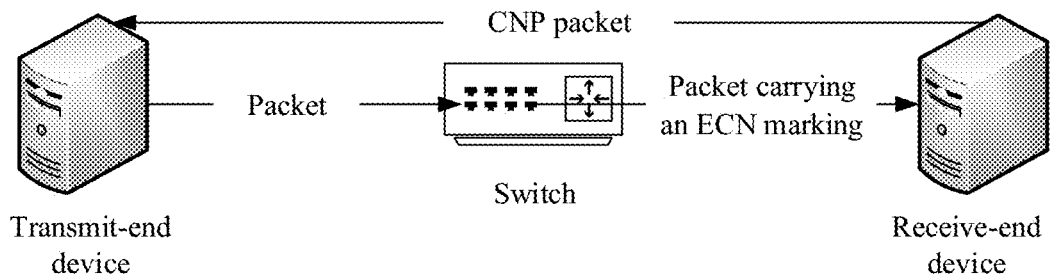
FIG. 1 is a schematic diagram of a DCQCN-based congestion control scene according to a conventional technology.
Figure 2:
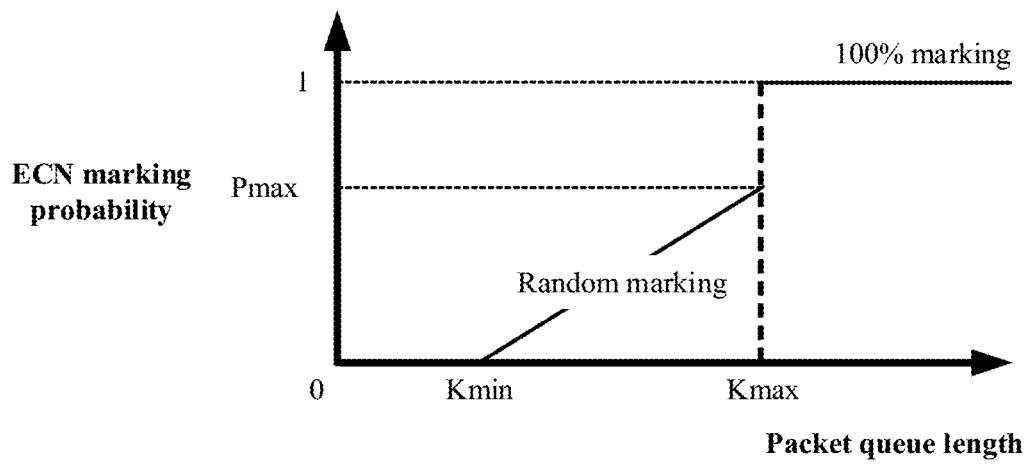
FIG. 2 is a schematic diagram of a packet ECN marking waterline according to a conventional technology.

FIG. 2 is a schematic diagram of a packet ECN marking waterline according to a conventional technology. As shown in FIG. 2, a lateral axis represents a length of a packet queue (which is referred to as a queue length or a queue depth), and a longitudinal axis represents an ECN marking probability, that is, a probability that an ECN marking is made on a packet in the packet queue. As shown in FIG. 1, in an existing DCQCN-based network congestion control solution, a switch uses an ECN flag bit in an internet protocol (IP) header of a packet to indicate whether network congestion has occurred or indicate a network congestion degree. For example, the ECN flag bit is set to 11, representing that congestion occurs on a current network, or the like. The switch determines, based on a packet queue length at an egress port, whether to make an ECN marking on a packet in a packet queue. The egress port is a port used by the switch to communicate with a receive-end device. Details are as follows.

As shown in FIG. 2, when the packet queue length is less than or equal to Kmin, it represents that a current network is not congested, and the switch does not need to make an ECN marking on the packet in the packet queue. When the packet queue length is greater than Kmin and less than Kmax, it represents that the current network is congested but a congestion degree is not serious, and the switch randomly makes an ECN marking on the packet in the packet queue based on an ECN marking probability corresponding to the packet queue length shown in the figure. Pmax in the figure is an ECN marking probability when the packet queue length is Kmax. When the packet queue length is greater than or equal to Kmax, it represents that the current network is seriously congested, and the switch makes an ECN marking on each packet in the packet queue. Correspondingly, after receiving a packet that is sent by the switch and that carries an ECN marking, the receive-end device may generate a CNP and feed the CNP back to a transmit-end device, to notify the transmit-end device to reduce a packet sending rate, thereby avoiding network congestion.

It can be learned that FIG. 1 and FIG. 2 propose a congestion control solution that is based on a static ECN marking. However, in actual application, the solution is applied to a data center network in which network traffic changes dynamically with time, and can hardly guarantee performance indicator requirements such as a high throughput and a low latency imposed by network transmission. Details are embodied in the following aspects:

Packet queue outbound rates are different. In a parallel processing scene, a switch side supports a plurality of packet queues waiting for processing. If network congestion control is still performed by using the existing congestion control solution that is based on a static ECN marking, it can hardly guarantee network performance requirements such as a high throughput and a low latency. Therefore, it can be learned that when packet queue outbound rates are different, to guarantee performance indicator requirements such as a high throughput and a low latency, ECN markings of packets in a packet queue should also be different.

Figure 3:
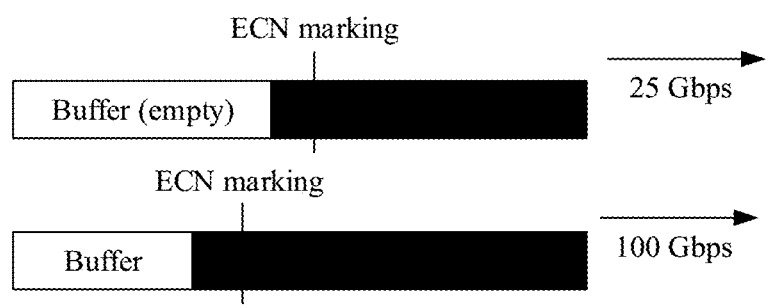
FIG. 3 is a schematic diagram of an ECN marking scene with different packet queue outbound rates according to a conventional technology.

FIG. 3 is a schematic diagram of ECN markings at different packet queue outbound rates. As shown in FIG. 3, a white rectangular portion represents a storage space buffer that is empty and that does not store a packet, and a black rectangular portion represents a storage space that stores packets in a form of a packet queue. In the figure, for example, packet queue outbound rates are respectively 25 Gbps (gigabits per second) and 100 Gbps. At different packet queue outbound rates, the switch uses different ECN marking waterlines (which may be specifically ECN marking probabilities) to make ECN markings on the packets in the packet queue. As shown in the figure, at different packet queue outbound rates, packets on which an ECN marking is made in the packet queue are also different.

Figure 4A:
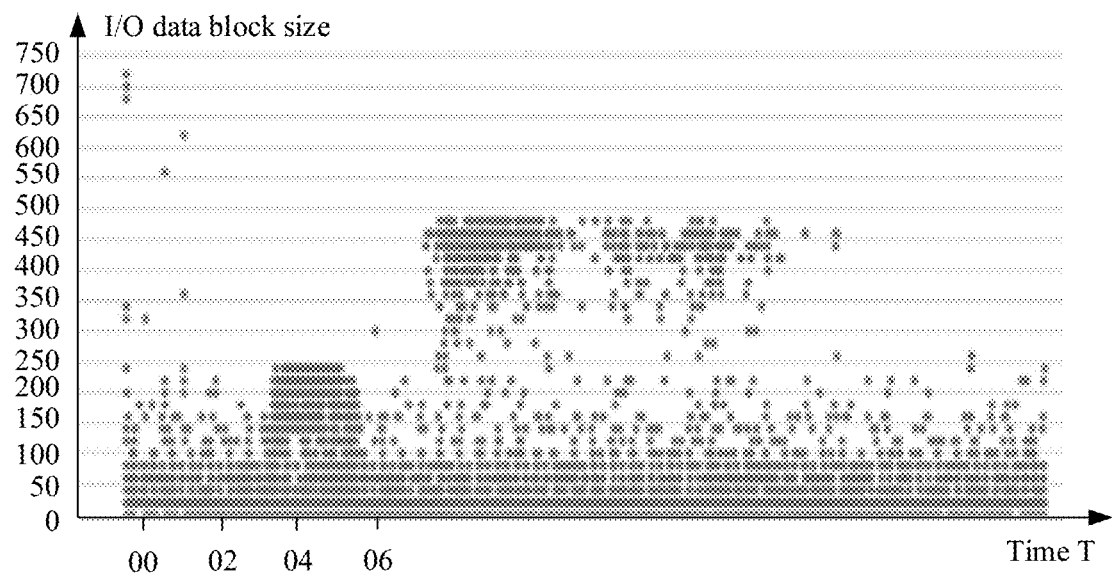
FIG. 4A is a dynamic schematic diagram illustrating how an I/O data size varies with time according to a conventional technology.
Figure 4B:
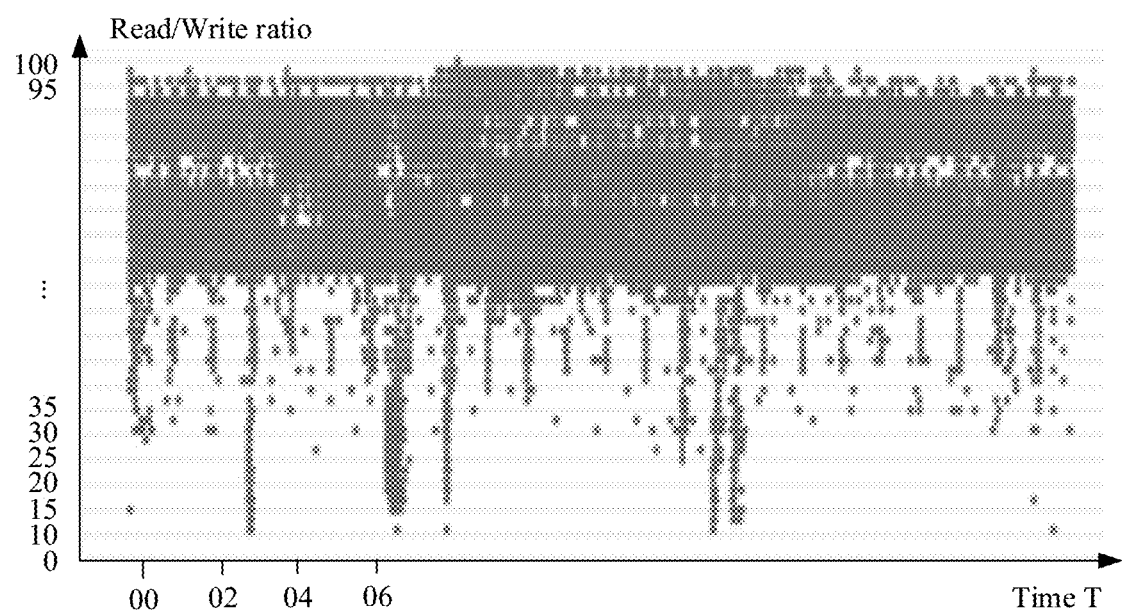
FIG. 4B is a dynamic schematic diagram illustrating how a data read/write ratio varies with time according to a conventional technology.

Second, network traffic varies dynamically with time. In a data storage service, network traffic of a data center network that bears the service is related to indicators such as a data read/write ratio and an input/output (input/output, I/O) data size. However, the data read/write ratio and the I/O data size vary with time, so that the network traffic also varies dynamically with time. For details, refer to dynamic schematic diagrams shown in FIG. 4A and FIG. 4B, which respectively illustrate how an I/O data size and a data read/write ratio vary with time.

Figure 5A:
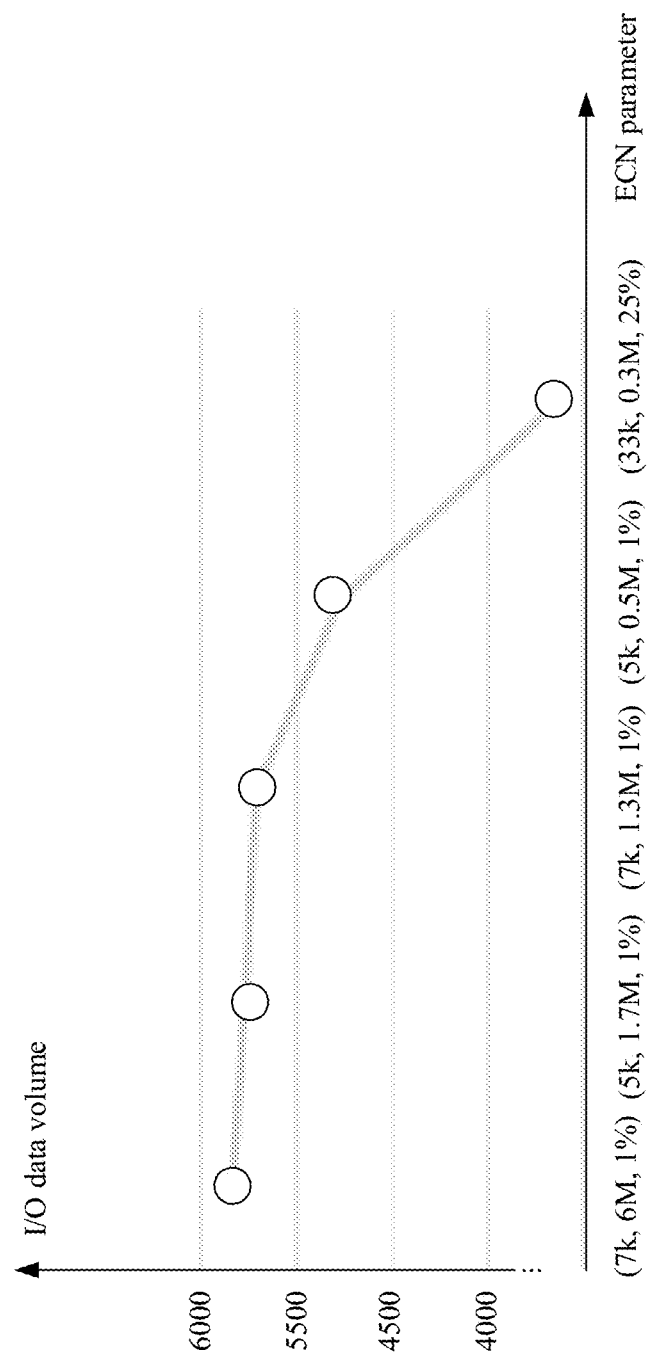
FIG. 5A and FIG. 5B are two schematic diagrams illustrating impact of different ECN marking waterlines on a network performance indicator according to a conventional technology.
Figure 5B:
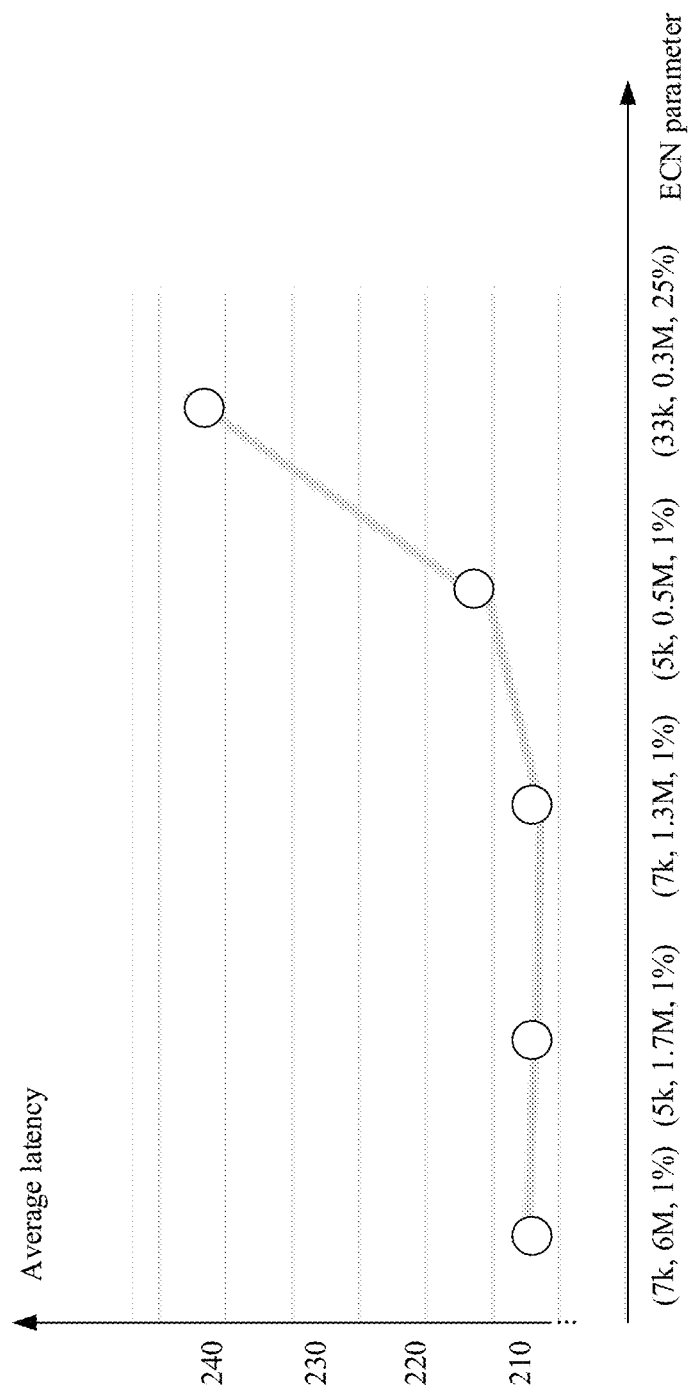

Third, when network traffic is the same, that is, in a same network traffic scene, service performance (network performance) varies relatively obviously with different ECN marking solutions. For example, network performance indicators include input/output per second (IOPS) of a network and an average latency of network data transmission. FIG. 5A and FIG. 5B are schematic diagrams of impact of different ECN marking solutions on network performance indicators in a same network traffic scene. As shown in FIG. 5A, a lateral axis represents three ECN marking parameters (Kmin, Kmax, and Pmax) involved in an ECN marking, and a longitudinal axis represents input/output per second. As shown in FIG. 5B, a lateral axis represents three ECN marking parameters (Kmin, Kmax, and Pmax) involved in an ECN marking, and a longitudinal axis represents an average latency of network transmission. It can be learned from FIG. 5A and FIG. 5B that in the same network traffic scene, an ECN marking solution of (7K, 6M, 1%) selected by a switch achieves better network performance such as a low latency and a high throughput than a selected ECN marking solution of (33K, 0.3M, 25%).

It can be learned from the descriptions of the foregoing three aspects that the existing congestion control solution that is based on a static ECN marking cannot adapt to a scene in which network traffic changes dynamically and cannot effectively guarantee network performance requirements such as a high throughput and a low latency.

Figure 6:
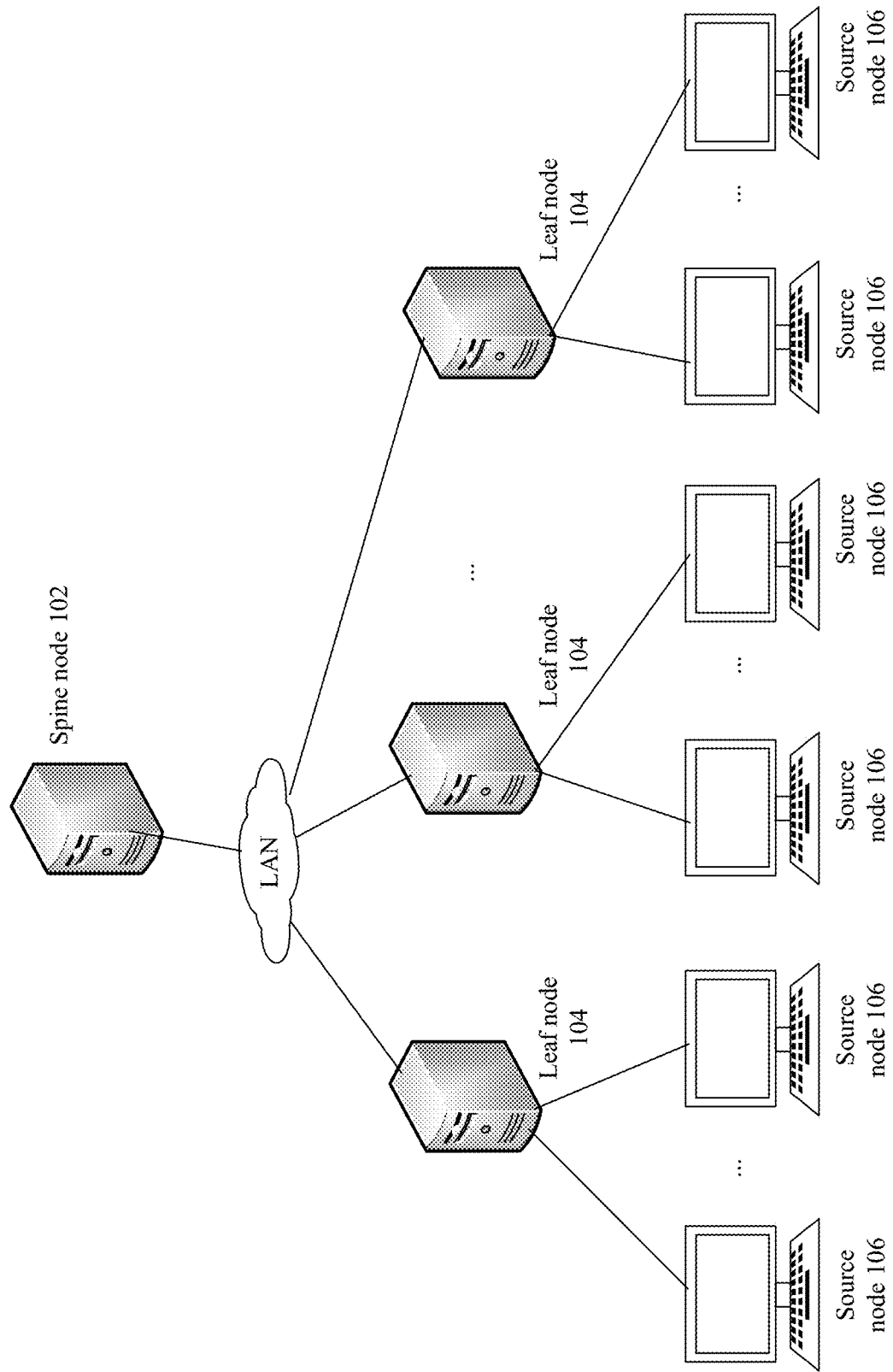
FIG. 6 is a schematic diagram of a structure of a spine-leaf network system according to an embodiment of this application.

To resolve the foregoing problem, this application proposes a network congestion control method, and a system framework, an apparatus, and a device to which the method applies. FIG. 6 is a schematic diagram of a framework of a spine-leaf network system. The spine-leaf network system 100 shown in FIG. 6 includes a spine node 102 and at least two leaf nodes 104 that communicate with the spine node 102. Optionally, the spine-leaf network system 100 further includes at least one source node 106 that supports communication with each leaf node 104. A quantity of spine nodes 102 is not limited. One spine node 102 is shown as an example in the figure. However, this does not constitute a limitation. A quantity of leaf nodes 104 that communicate with the spine node 102 is not limited either. N leaf nodes are shown as an example in the figure, which are respectively a leaf node 1 to a leaf node N in the figure. In addition, each leaf node 104 supports communication with one or more source nodes 106.

As shown in the figure, the spine-leaf network system 100 uses a two-layer network topology framework: access layer-aggregation layer. The spine node 102 is deployed in the aggregation layer, the leaf node 104 that communicates with the spine node 102 is deployed in the access layer, and the source node 106 that communicates with the leaf node 104 is deployed below the access layer. The source node 106 may also be referred to as a host node 106. The spine node 102 and the leaf node 104 in the spine-leaf network system 100 are both configured to forward data traffic. A source node 106 communicates, by using the spine node and a leaf node 104 that communicates with the source node, with a source node under another leaf node.

A network topology corresponding to the spine-leaf network system 100 may be referred to as a global network topology. To be specific, a network topology including all nodes in the spine-leaf network system 100 is referred to as the global network topology of the spine-leaf network system 100. For example, in FIG. 6, the global network topology includes the spine node 102 and the N leaf nodes 104 that communicate with the spine node 102. Optionally, if the spine-leaf network system 100 further includes at least one source node 106 that each leaf node 104 can communicate with, the global network topology may further include at least one source node 106 that communicates with each of the N leaf nodes 104.

Correspondingly, a network topology including some nodes in the spine-leaf network system 100 is referred to as a local network topology of the spine-leaf network system 100. For example, in FIG. 6, a network topology including one leaf node 104 and at least one source node 106 that communicates with the leaf node is referred to as a local network topology.

In actual application, the spine node 102 and the leaf node 104 each may be deployed as a network device with a data forwarding function, for example, a switch, a router, or another device. The source node 106 may be deployed as a terminal device, including but not limited a mobile phone, a tablet computer, a personal digital assistant (PDA), a mobile internet device (MID), a wearable device, a vehicle-mounted device, and other devices supporting network communication.

Figure 7:
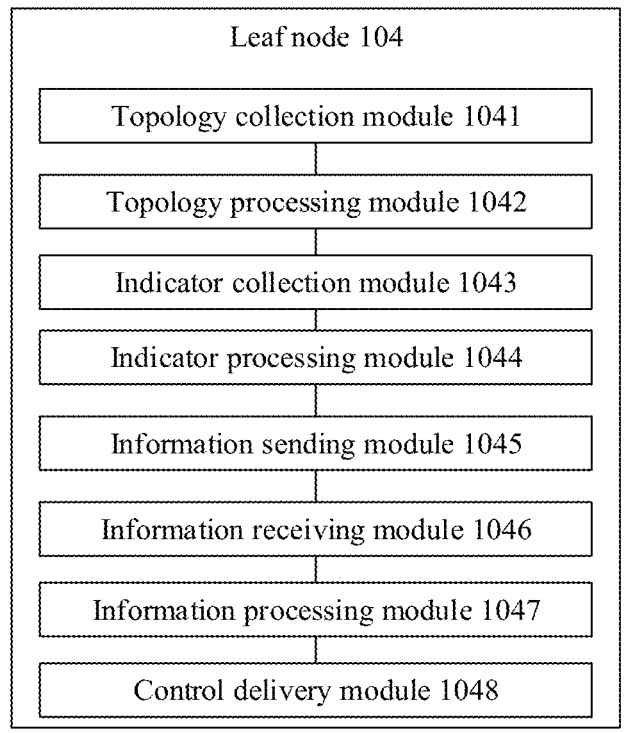
FIG. 7 is a schematic diagram of a structure of a leaf node 104 according to an embodiment of this application.

FIG. 7 is a schematic diagram of a possible internal structure of a leaf node 104 illustrated in this application. The leaf node 104 shown in FIG. 7 includes a topology collection module 1041, an indicator collection module 1043, and an information sending module 1045. Optionally, the leaf node may further include a topology processing module 1042, an indicator processing module 1044, an information receiving module 1046, an information processing module 1047, and a control delivery module 1048.

The topology collection module 1041 is configured to collect network topology information of the leaf node 104. The network topology information is used to reflect network layout of the leaf node 104 in the spine-leaf network system 100, including but not limited to information such as an uplink/downlink port role, port connection information, and a port bandwidth of the leaf node. The uplink/downlink port role is used to reflect whether a communication port of the leaf node 104 is an uplink port or a downlink port. A port connection relationship is used to reflect at least one source node 106 that communicates with the leaf node and a connection relationship between the leaf node 104 and the source node 106. Optionally, the port connection relationship is further used to reflect a neighboring node that communicates with the leaf node and a connection relationship between the leaf node and the neighboring node, and the like. The neighboring node is a node located in a communication radius of the leaf node 104, and may be specifically a spine node, a leaf node, a source node, or the like. A specific quantity of neighboring nodes is not limited, and may be one or more. The communication radius may be a custom setting of the system, for example, an empirical value that is set based on user experience or a value obtained through calculation based on a series of statistical data.

The topology processing module 1042 is configured to process the collected network topology information, and may specifically encapsulate the network topology information by using a first preset format, to obtain first encapsulated information. The topology processing module 1042 sends the first encapsulated information to the information sending module 1045. The first preset format is a data encapsulation format in the custom setting of the system, and includes but is not limited to a preconfigured structural body, IP packet format, or the like.

The indicator collection module 1043 is configured to periodically collect, from a forwarding chip of the leaf node 104, a network performance indicator (key performance indicator, KPI) of the leaf node 104, which may also be referred to as network status information or a network performance parameter. The network performance indicator is an indicator parameter used to describe network performance of the leaf node 104. The network performance indicator may include but is not limited to an uplink/downlink role of a port of the leaf node 104 (the uplink/downlink role is specifically divided into an uplink port and a downlink port), utilization of the port (which may be specifically an uplink port or a downlink port) of the leaf node 104, a quantity of forwarded bytes, a quantity of forwarded packets, a length of a packet queue (referred to as a queue depth), a quantity of priority-based flow control (PFC) packets transmitted by the port, a quantity of packets that carry an ECN marking (referred to as a quantity of ECN marking packets), a network latency, a network bandwidth, or other parameters affecting the network performance.

The indicator processing module 1044 is configured to process the collected network performance indicator, and may specifically encapsulate the network performance indicator by using a second preset format, to obtain second encapsulated information. The indicator processing module 1044 sends the second encapsulated information to the information sending module 1045.

The information sending module 1045 is configured to send information. Specifically, if the leaf node 104 includes the topology processing module 1042 and the indicator processing module 1044, the information sending module 1045 sends the received first encapsulated information and second encapsulated information as network information to another node, for example, a spine node 102 that communicates with the leaf node 104.

Otherwise, if the leaf node 104 does not include the topology processing module 1042 and the indicator processing module 1044, the topology collection module 1041 may directly send the collected network topology information to the information sending module 1045. The indicator collection module 1043 may directly send the collected network performance indicator to the information sending module 1045. Correspondingly, the information sending module 1045 may encapsulate the network topology information and the network performance indicator by using a third preset format, to obtain network information; and then send the network information to another node, for example, a spine node 102 that communicates with the leaf node 104. The spine node 102 performs corresponding network congestion control based on the network information. Details are described below in this application.

In actual application, the first preset format, the second preset format, and the third preset format in this application all may be data encapsulation formats in the custom setting of the system, for example, a preconfigured structural body, IP packet format, or the like. In actual application, any two of the first preset format, the second preset format, and the third preset format may be the same or may be different. This is not limited in this application.

The information receiving module 1046 is configured to receive information. Specifically, the information receiving module 1046 may receive a network traffic scene sent by the spine node 102. The network traffic scene may be specifically an identifier of the scene, which is used to distinguish the network traffic scene. The identifier may be specifically an index number, a serial number, an identity, or the like of the scene. This is not limited. Alternatively, the information receiving module 1046 may receive target control information sent by the spine node 102. The target control information is used to indicate to perform network congestion control on the leaf node 104. Details are described below in this application.

The information processing module 1047 is configured to process the information received by the information receiving module 1046. For example, the received information is the network traffic scene. The information processing module 1047 may specifically obtain corresponding target control information based on the network traffic scene. The target control information is used to indicate to perform network congestion control on the leaf node 104. Details about processing by the information processing module 1047 and how to implement network congestion control based on the target control information are described below in this application.

The control delivery module 1048 is configured to deliver target control information to the forwarding chip of the leaf node 104. The information may be specifically the target control information received by the information receiving module 1046 or the target control information processed by the information processing module 1047. The forwarding chip of the leaf node 104 performs network congestion control on the leaf node based on the target control information.

For content that is not described or not described in detail in this embodiment of this application, correspondingly refer to related descriptions in the following method embodiment of FIG. 10. Details are not described herein.

Figure 8:
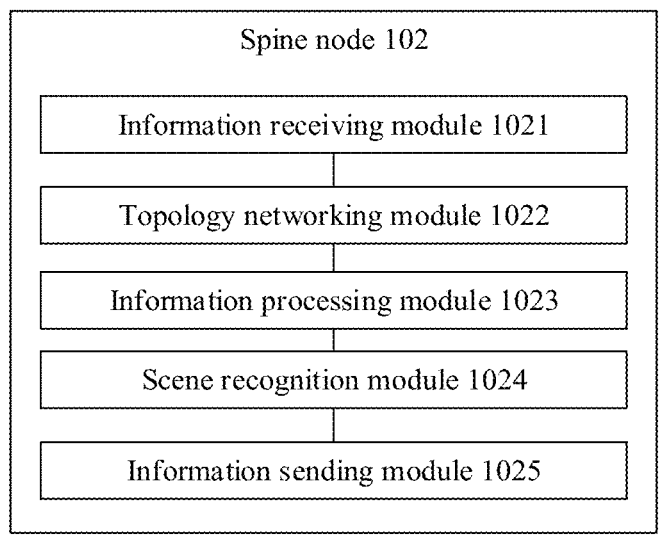
FIG. 8 is a schematic diagram of a structure of a spine node 102 according to an embodiment of this application.

FIG. 8 is a schematic diagram of an internal structure of a spine node 102 according to an embodiment of this application. The spine node 102 shown in FIG. 8 includes an information receiving module 1021, a topology networking module 1022, an information processing module 1023, a scene recognition module 1024, and an information sending module 1025.

The information receiving module 1021 is configured to receive network information sent by each leaf node 104. The network information carries network topology information and a network performance indicator of the leaf node.

The topology networking module 1022 is configured to network each leaf node 104 and the spine node 102 based on the network topology information of each leaf node 104, to obtain a combined network topology. Specifically, after receiving the network information, the topology networking module 1022 decapsulates the network information, to obtain the network topology information of the node included in the network information. Correspondingly, the topology networking module 1022 may receive network topology information of one or more nodes 104, and construct a combined network topology based on the network topology information of each node. If the combined network topology is a global network topology of a spine-leaf network system 100, in other words, the combined network topology includes all nodes in the spine-leaf network system 100, it represents that the combined network topology is the global network topology. Then, the topology networking module 1022 may send a processing notification message to the information processing module 1023, to notify the information processing module 1023 to start processing.

The information processing module 1023 is configured to obtain, from the information receiving module 1021, the network performance indicator of each leaf node 104 in the global network topology; and then preprocess the network performance indicator of each leaf node to obtain a target performance indicator. The preprocessing may be processing in a custom setting of the system. For example, the preprocessing may include but is not limited to any one or combination of the following items: data filtering processing (for example, filtering a network performance indicator of a downlink port or removal of an abnormal value), data conversion processing (for example, format conversion or averaging processing), normalization processing, and the like. For example, the preprocessing is normalization processing. In actual application, the network performance indicator may include a plurality of indicators, for example, a packet length, a network latency, and the like. These network performance indicators may be not of a same dimension or a same order of magnitude. After obtaining the network performance indicator of each leaf node, the information processing module 1023 needs to perform normalization processing to convert the network performance indicators to a same dimension, to obtain a corresponding target performance indicator.

For another example, the preprocessing is data conversion processing. If the network performance indicator of the leaf node 104 includes a quantity of forwarded bytes and a quantity of forwarded packets, the information processing module 1023 may obtain an average packet length of the leaf node 104 through calculation based on the quantity of forwarded bytes and the quantity of forwarded packets. Specifically, the average packet length may be obtained through calculation by using the following formula (1):

$$\text{Average packet length} = \frac{\text{Quantity of forwarded bytes}}{\text{Quantity of forwarded packets}} \quad \text{Formula (1)}$$

The scene recognition module 1024 is configured to perform scene recognition on the target performance indicator, to obtain recognized information. The recognized information may be specifically a current network traffic scene of the spine-leaf network system 100, or may be target control information that corresponds to the network traffic scene and that is obtained based on the network traffic scene. The target control information is used to indicate to perform network congestion control on at least one leaf node 104 in the spine-leaf network system 100.

The information sending module 1025 is configured to send the recognized information obtained through recognition by the scene recognition module 1024 to any one or more leaf nodes 104 in the spine-leaf network system 100. The leaf node 104 obtains the corresponding target control information based on the recognized information, and then performs corresponding network congestion control on the leaf node 104 as indicated by the target control information.

For content that is not described or not described in detail in this embodiment of this application, correspondingly refer to related descriptions in the following method embodiment of FIG. 9. Details are not described herein.

The following describes several typical application scenes of a data storage service and subdivided network traffic scenes in each application scene. Currently, typical application scenes of the data storage service include online transaction processing (OLTP), online analytical processing (OLAP), virtual desktop infrastructure (VDI), email (exchange server), file service, video, and the like. In actual application, a system may determine, based on some variable parameters involved in a data storage process, an application scene of the system and subdivided network traffic scenes in the application scene. The variable parameters may be parameters in a custom setting of the system, and may include but are not limited to randomness of data read/write (RWmode), a read/write ratio, a data block size, a concurrency (iodepth), and the like. The randomness of read/write is used to indicate a data operation mode, for example, serial read/write, random read/write, read-only, or write-only. The read/write ratio is used to indicate a ratio of data writes to data reads that is supported by the system. The read/write ratio can reflect network congestion to some extent. The data block size is used to indicate a size of a minimum unit used in data transmission. For example, the data block size may be specifically a fixed block size, a random block size, or the like. The concurrency is used to indicate a volume of data that can be processed concurrently by the system, and may also be understood as a quantity of tasks. Table 1 below is a specific schematic table illustrating several typical application scenes.

TABLE 1

| Typical scenes | | Read/Write ratio | Block size (block size) | Concurrency (iodepth) | Randomness of read/write (RWmode) |
|---|---|---|---|---|---|
| OLTP | OLTP-DATA | Randrw = 7:3 | bsrange = 8K-64K | 8, 16, 32, 64, 128, 256 | W + R |
| | | Randrw = 5:5 | bsrange = 8K-64K | 8, 16, 32, 64, 128, 256 | W + R |
| | OLTP-LOG | Write | bsrange = 512 bits-64K | 8, 16, 32, 64, 128, 256 | Write |
| OLAP | | rw = 9:1 | bsrange = 256K-4M | 8, 16, 32, 64, 128, 256 | W + R |
| | | rw = 5:5 | bsrange = 256K-4M | 8, 16, 32, 64, 128, 256 | W + R |
| VDI | Power on | Randrw = 9:1 | bsrange = 8K-16K | 8, 16, 32, 64, 128, 256 | W + R |
| | Routine | Randrw = 2:8 | bsrange = 1K-16K | 8, 16, 32, 64, 128, 256 | W + R |
| Exchange server | | Randrw = 6:4 | bsrange = 32K-512K | 8, 16, 32, 64, 128, 256 | W + R |
| | | Randrw = 3:7 | bsrange = 32K-512K | 8, 16, 32, 64, 128, 256 | W + R |
| File server | Web file server | Randrw = 9:1 | bsrange = 4K-64K | 8, 16, 32, 64, 128, 256 | W + R |
| | Web server log | Write | 8K | 8, 16, 32, 64, 128, 256 | Write |
| Video | Video publish | rw = 2:8 | 64K | 8, 16, 32, 64, 128, 256 | W + R |
| | Internet backup | rw = 2:8 | bsrange = 16K-64K | 8, 16, 32, 64, 128,256 | W + R |
| | | rw = 4:6 | bsrange = 16K-64K | 8, 16, 32, 64, 128, 256 | W + R |
| | VOD | read | bsrange = 256K-4M | 8, 16, 32, 64, 128,256 | read |

As shown in Table 1 above, based on a data processing type, OLTP application scenes are divided into data online transaction processing OLTP-DATA and log online transaction processing OLTP-LOG. In addition, in each application scene, there are different corresponding subdivided network traffic scenes based on different concurrencies. For example, in Table 1 above, using the OLTP-DATA application scene as an example, the system defines, as a scene 1, a corresponding network traffic scene in which a read/write ratio randrw is 7:3, a data block size bsrange is in a range of 8K-64K, a concurrency iodepth is 8, and random read/write is supported (that is, RWmode is write W+read R). The system defines, as a scene 2, a network traffic scene in which a read/write ratio randrw is 7:3, a data block size bsrange is in a range of 8K-64K, a concurrency iodepth is 16, and random read/write is supported (that is, RWmode is write W+read R). By analogy, the OLTP-DATA application scene is specifically subdivided into six network traffic scenes. The six network traffic scenes support a same read/write ratio, a same range of a data block size, and same randomness of read/write. A difference lies in that the network traffic scenes support different concurrencies.

Correspondingly, each storage service scene may be divided into finer-grain subdivided application scenes based on a requirement of the storage service scene. For example, in the table, virtual desktop infrastructure VDI may be divided into power on and routine; file service may be divided into web file service and web service log; and video is divided into video publish, internet backup, video on demand (video on demand, VOD), and other application scenes. For network traffic scenes included in each application scene, refer to descriptions above. Details are not described herein again.

Figure 9:
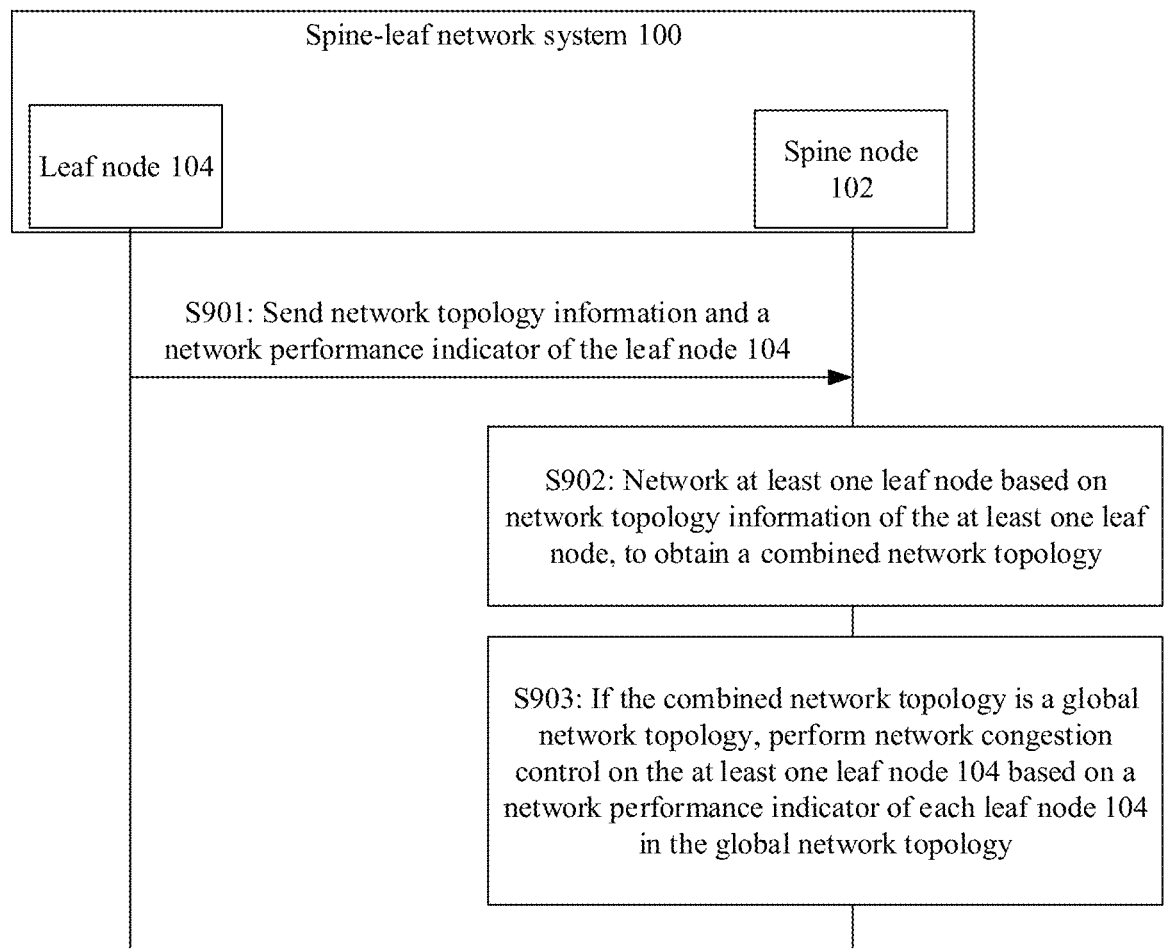
FIG. 9 is a schematic flowchart of a network congestion control method according to an embodiment of this application.

FIG. 9 is a schematic flowchart of a network congestion control method according to an embodiment of this application. The method shown in FIG. 9 is applied to the spine-leaf network system shown in FIG. 6. The method includes the following implementation steps:

S901. Any leaf node 104 in the spine-leaf network system sends network information to a spine node 102, where the network information includes network topology information of the leaf node and a network performance indicator of the leaf node. Correspondingly, the spine node 102 receives the network information sent by the leaf node 104.

Any one or more leaf nodes 104 in the spine-leaf network system 100 in this application may periodically collect network topology information and a network performance indicator of the leaf node 104. Then, the leaf node 104 encapsulates the collected network topology information and network performance indicator into network information, and periodically sends the network information to the spine node 102. A specific implementation is as follows:

For example, to ensure data transmission security, the leaf node 104 may encapsulate information twice. For example, the leaf node 104 may separately encapsulate the network topology information of the leaf node 104 and the network performance indicator of the leaf node 104, to correspondingly obtain first encapsulated information and second encapsulated information; and then encapsulate the first encapsulated information and the second encapsulated information into network information and send the network information to the spine node 102.

For another example, to reduce a calculation workload and lighten burden on the node, the leaf node 104 may directly encapsulate the collected network topology information and network performance indicator once to obtain network information, and send the network information to the spine node 102. For a specific implementation of information encapsulation, refer to related descriptions in the embodiment of FIG. 7. Details are not described herein again. In addition, for descriptions of the network topology information and the network performance indicator in this application, also refer to related descriptions in the embodiment of FIG. 7. Details are not described herein again.

The network information involved in this application may also be referred to as a network message. For ease of description, network information is uniformly used as an example for describing related content in this application. When the leaf node 104 sends the network information to the spine node 102, an encapsulation format corresponding to the network information is a data transmission format used when the leaf node 104 and the spine node 102 communicate with each other. To be specific, the leaf node 104 encapsulates the network topology information and the network performance indicator of the node into an inter-node message or inter-node information (that is, network information) that supports communication with the spine node 102, and directly sends the network information to the spine node 102. Alternatively, the leaf node 104 may send the network information to the spine node 102 or the like by using a remote procedure call (google remote procedure call protocol, gRPC) channel. This is not limited in this application.

S902. The spine node 102 networks the at least one leaf node 104 and the spine node 102 based on the received network topology information of the at least one leaf node 104, to obtain a combined network topology.

The spine node 102 may receive the network information sent by the at least one leaf node 104 in the spine-leaf network system 100, and then decapsulates the received network information of each leaf node 104, to obtain the network topology information and the network performance indicator of the leaf node 104. Details are as follows.

For example, if the leaf node 104 obtains the network information by performing encapsulation twice, the spine node 102 also needs to perform decapsulation twice to obtain the network topology information and the network performance indicator of the leaf node 104. Specifically, the spine node 102 may obtain the first encapsulated information and the second encapsulated information by performing decapsulation on the network information for the first time; and then may correspondingly obtain the network topology information of the leaf node 104 and the network performance indicator of the leaf node by separately decapsulating the first encapsulated information and the second encapsulated information.

For another example, if the leaf node 104 obtains the network information by performing encapsulation once, the spine node 102 may also obtain the network topology information and the network performance indicator of the leaf node 104 by performing decapsulation once correspondingly. For example, the spine node 102 directly decapsulates the network information, to obtain the network topology information and the network performance indicator of the leaf node 104 that are included in the network information.

After obtaining the network topology information of the at least one leaf node 104, the spine node 102 may network the at least one leaf node 104 and the spine node 102 based on the network topology information of the at least one leaf node 104, to obtain the combined network topology. For example, a combined network topology including the at least one leaf node 104 may be constructed based on the network topology information (for example, a node connection relationship) of each leaf node 104 and network topology information of the spine node 102.

S903. When the combined network topology is a global network topology of the spine-leaf network system, perform network congestion control on the at least one leaf node 104 based on the network performance indicator of each leaf node 104 in the global network topology.

After obtaining the combined network topology, the spine node 102 may further determine whether the combined network topology is the global network topology of the spine-leaf network system 100. A specific implementation is as follows:

For example, when the spine-leaf network system 100 is constructed, the spine node 102 stores information of each node in the spine-leaf network system 100, and specifically stores information of the spine node 102 and information of all leaf nodes 104 that communicate the spine node 102, for example, ID numbers of the leaf nodes 104. In actual application, a form in which the information of each node is stored in the spine node 102 is not limited. For example, the information of each node is stored in the spine node 102 in a form of a configuration file, a table, or the like. Correspondingly, after obtaining the combined network topology, the spine node 102 determines whether the combined network topology includes all the nodes in the spine-leaf network system 100; and if the combined network topology includes all the nodes, determines that the combined network topology is the global network topology of the spine-leaf network system 100; otherwise, determines that the combined network topology is a local network topology of the spine-leaf network system 100.

For another example, network topology information of each node in the spine-leaf network system includes a neighboring node of the node. The neighboring node is one or more nodes located in a communication radius of the node. In other words, the network topology information of each node indicates the neighboring node existing in the communication radius of the node. Correspondingly, after obtaining the combined network topology, the spine node 102 determines whether the combined network topology includes all neighboring nodes of each node in the spine-leaf network system 100, or determines whether the combined network topology includes all neighboring nodes of the spine node 102; and if the combined network topology includes all neighboring nodes, determines that the combined network topology is the global network topology of the spine-leaf network system 100; otherwise, determines that the combined network topology is a local network topology of the spine-leaf network system 100.

Figure 10:
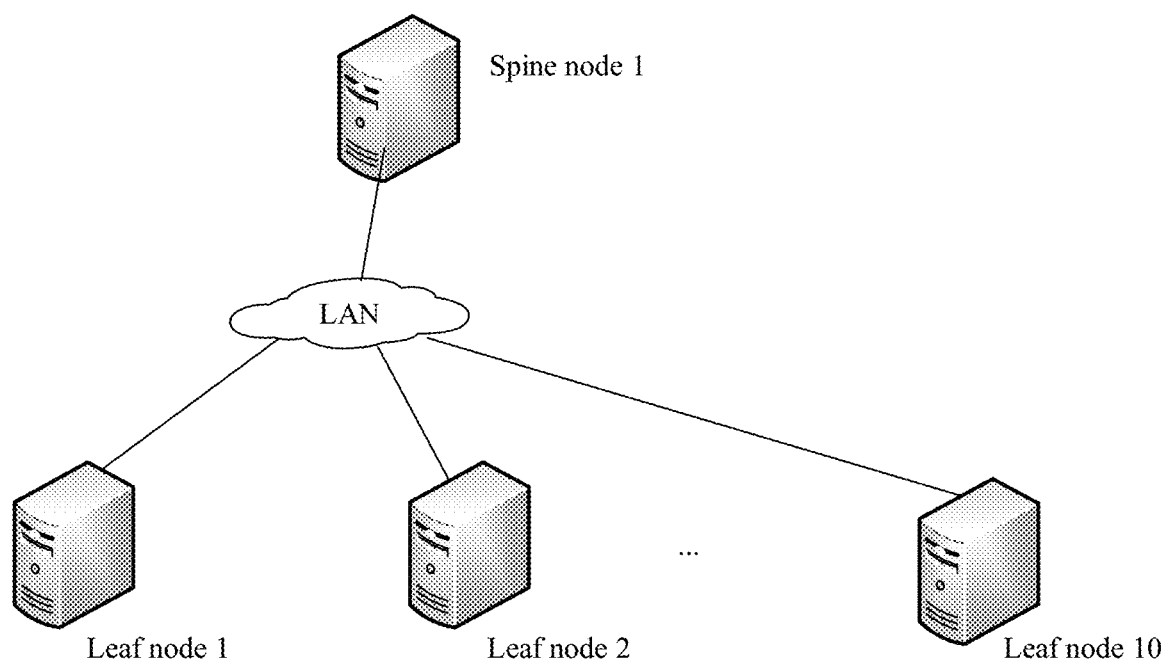
FIG. 10 is a schematic diagram of a structure of another spine-leaf network communication system according to an embodiment of this application.

For example, FIG. 10 is a schematic diagram of a structure of another spine-leaf network system. As shown in FIG. 10, the spine-leaf network system shows a spine node 1, and 10 leaf nodes that communicate with the spine node 1, which are respectively a leaf node 1 to a leaf node 10 in the figure. In this example, it is assumed that neighboring nodes of the leaf node 1 include the spine node 1 and all source nodes that are connected to the leaf node 1, and that neighboring nodes of the leaf node 2 include the spine node 1 and all source nodes that are connected to the leaf node 2.

The spine node 1 receives network information sent by the leaf node 1 and the leaf node 2, and obtains network topology information of the leaf node 1 and the leaf node 2 by parsing the network information; and then constructs, based on the network topology information of the leaf node 1 and the leaf node 2, a combined network topology that includes the spine node 1, the leaf node 1, and the leaf node 2. The combined network topology does not include all neighboring nodes of the spine node 1. Then, the spine node 1 may determine that the combined network topology is a local network topology rather than a global network topology of the spine-leaf network system.

After determining that the combined network topology is the global network topology of the spine-leaf network system, the spine node 102 may perform network congestion control on any one or more leaf nodes 104 in the global network topology based on the network performance indicator of each leaf node 104 in the global network topology, for example, performing network congestion control on a leaf node whose network traffic has changed, or the like. During specific implementation, step S903 includes the following implementation steps:

S9031. The spine node 102 calls a scene recognition model to process a target performance indicator, to obtain a network traffic scene of the spine-leaf network system 100, where the target performance indicator may be the network performance indicator of each leaf node 104 in the global network topology, or a network performance indicator obtained by preprocessing the network performance indicator of each leaf node 104 in the global network topology.

For example, without considering model calculation precision, the spine node 102 may directly use the network performance indicator of each leaf node 104 in the global network topology as the target performance indicator, and input the target performance indicator into the scene recognition model for processing, to obtain a current network traffic scene of the global network topology (that is, the spine-leaf network system 100). The network traffic scene may be specifically an identifier of the scene, which is used to represent the network traffic scene. For example, the identifier is a serial number, an index number, or an identity ID of the network traffic scene.

For another example, considering model calculation precision, the spine node 102 may first preprocess the network performance indicator of each leaf node 104 in the global network topology, for example, removing an abnormal value or performing normalization processing, to obtain the target performance indicator. For details about a specific implementation of preprocessing, refer to related descriptions in the embodiment of FIG. 7. Details are not described herein again. Further, the spine node 102 inputs the target performance indicator into the scene recognition model for processing, to obtain a current network traffic scene of the global network topology. The network traffic scene may be specifically an identifier of the network traffic scene.

The following describes an embodiment related to the scene recognition model. The scene recognition model may be trained in advance and deployed in the spine node 102. This is convenient for the spine node 102 to subsequently call the scene recognition model directly to process the target performance indicator. For example, a training platform may collect a training sample. The training sample includes a global network topology of any spine-leaf network system (for example, the spine-leaf network system 100 in FIG. 6) and an initial performance indicator and a corresponding initial traffic scene of each node in the spine-leaf network system. An initial model is trained by using the training sample, to obtain a trained scene recognition model. Then, the spine node 102 may obtain the scene recognition model from the training platform and deploy the scene recognition model in the spine node. Specifically, the spine node 102 may obtain the scene recognition model from the training platform by using a message request, or the training platform actively pushes the scene recognition model to the spine node 102.

In this application, the initial model is used for scene recognition, and may include but is not limited to a feed-forward neural network model, a feedback neural network model, a self-organizing neural network model, a stochastic neural network model, or other customized mathematical models for scene recognition. The initial performance indicator is the same as the network performance indicator of the leaf node 104. For details, refer to related descriptions of FIG. 7. Details are not described herein again. The initial traffic scene is a current traffic scene that is of the spine-leaf network system and that is correspondingly reflected by the initial performance indicator of each node. For details about division and determining of traffic scenes, refer to descriptions in the embodiment related to Table 1. Details are not described herein again.

An implementation form of the scene recognition model is not limited in this application, and may be, for example, a configuration file. Using a configuration file as an example, a format of the configuration file is not limited, and may be, for example, a tensorflow format officially defined by TensorFlow. If a file format corresponding to the scene recognition model obtained by the training platform through training does not support calling by the spine node 102, the spine node 102 needs to perform format conversion, for the spine node 102 (for example, a central processing unit (CPU) in the spine node 102) to call the scene recognition model. Specifically, the spine node 102 may call a model conversion tool to convert a scene recognition model file in the tensorflow format into a scene recognition model file in a target format, for the CPU of the spine node 102 to call the scene recognition model. The target format is a format that supports calling by the CPU, for example, file formats supported by X86, ARM, and an external chip.

Figure 11:
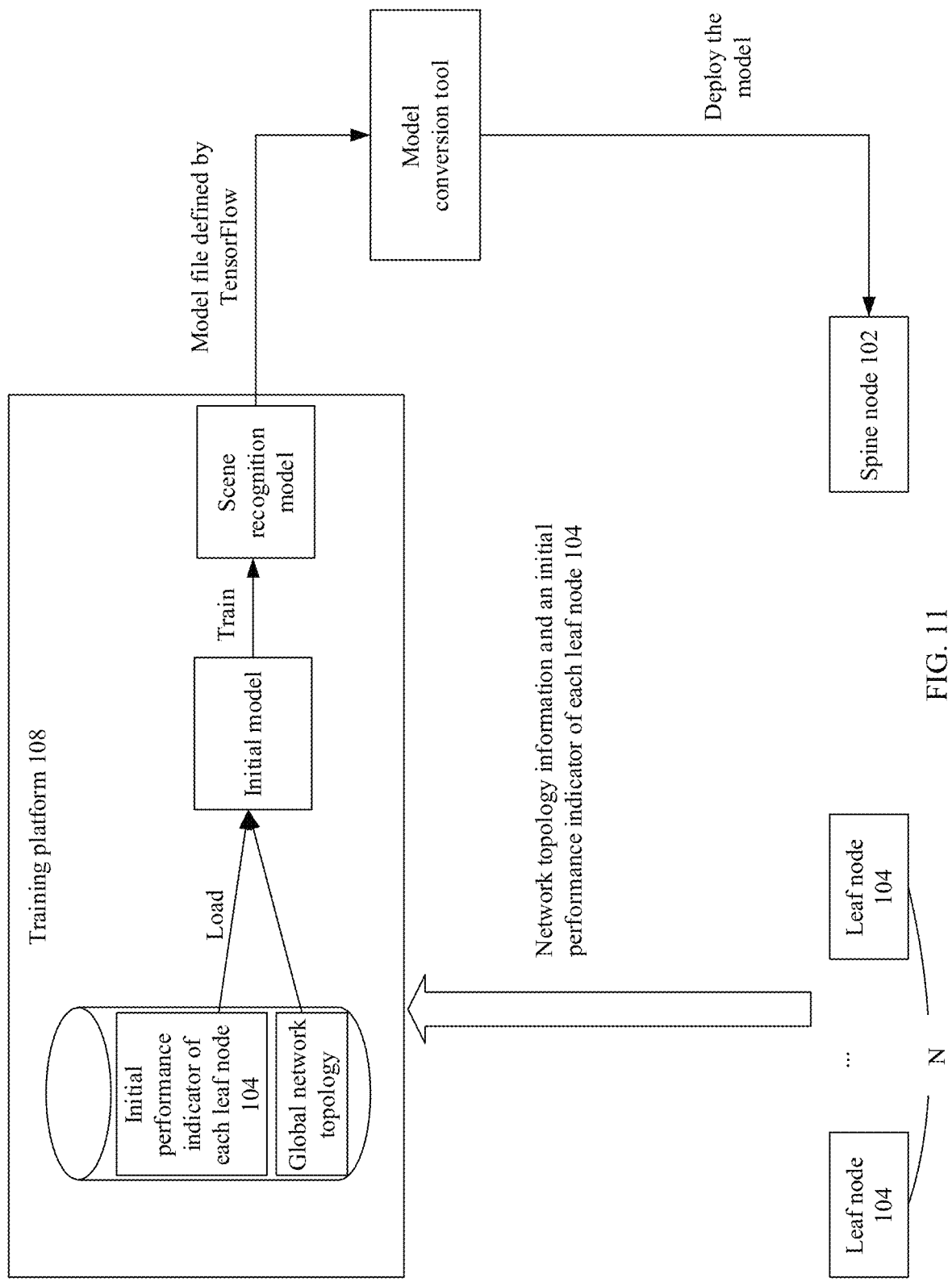
FIG. 11 is a schematic diagram of application of a scene recognition model according to an embodiment of this application.

FIG. 11 is a specific schematic diagram of application of a scene recognition model provided in this application. As shown in FIG. 11, each leaf node 104 (one leaf node 104 is shown in the figure as an example) in a spine-leaf network system may collect network topology information and an initial performance indicator of the leaf node 104 and send the network topology information and the initial performance indicator of the leaf node 104 to a training platform 108. The training platform 108 may receive information of each leaf node in the spine-leaf network system, to obtain a global network topology of the spine-leaf network system and the initial performance indicator of each leaf node 104. The training platform 108 loads the foregoing information to an initial model and trains the initial model to obtain a trained scene recognition model. In the figure, the scene recognition model is specifically deployed as a scene recognition model file in an official tensorflow format defined by TensorFlow, and does not support calling by a spine node 102. A model conversion tool may convert the scene recognition model file in the tensorflow format into a scene recognition model file in a target format. The target format may include but is not limited to file formats that can be processed by X86, ARM, an external chip, and the like. Then, the spine node 102 configures the scene recognition model file in the target format in the spine node, to implement deployment of the scene recognition model.

Figure 12:
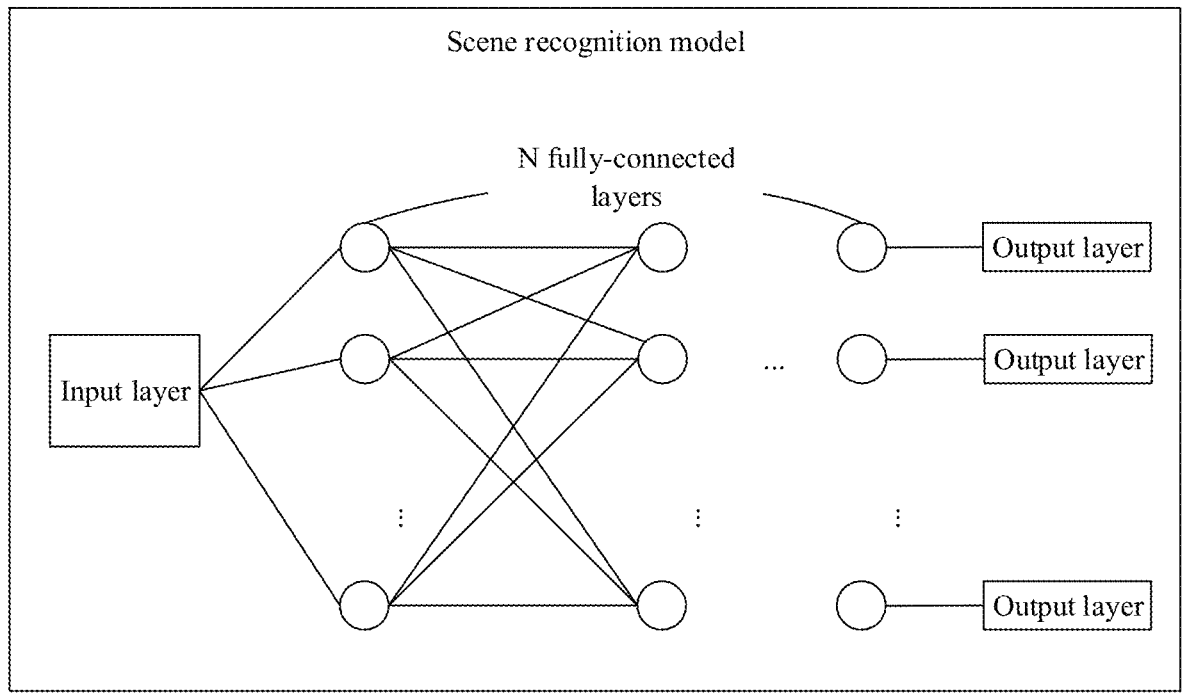
FIG. 12 is a schematic diagram of a structure of a scene recognition model according to an embodiment of this application.

Correspondingly, in a process of using the scene recognition model, the spine node 102 may call the scene recognition model to process the target performance indicator, to obtain the network traffic scene. For example, the scene recognition model is a neural network model. FIG. 12 is a schematic diagram of a structure of a neural network model. As shown in FIG. 12, the neural network model includes an input layer, a plurality of fully-connected layers, a softmax layer, and an output layer. For example, the spine node 102 inputs the target performance indicator into the input layer of the scene recognition model, performs fully-connected processing on the target performance indicator by using the plurality of fully-connected layers in the model in sequence, and then performs scene classification by using the softmax layer, to obtain a probability of each scene. The output layer finally chooses to output a scene with a largest probability as the network traffic scene.

S9032. The spine node 102 performs network congestion control on at least one leaf node 104 in the spine-leaf network system 100 based on the network traffic scene.

Figure 13:
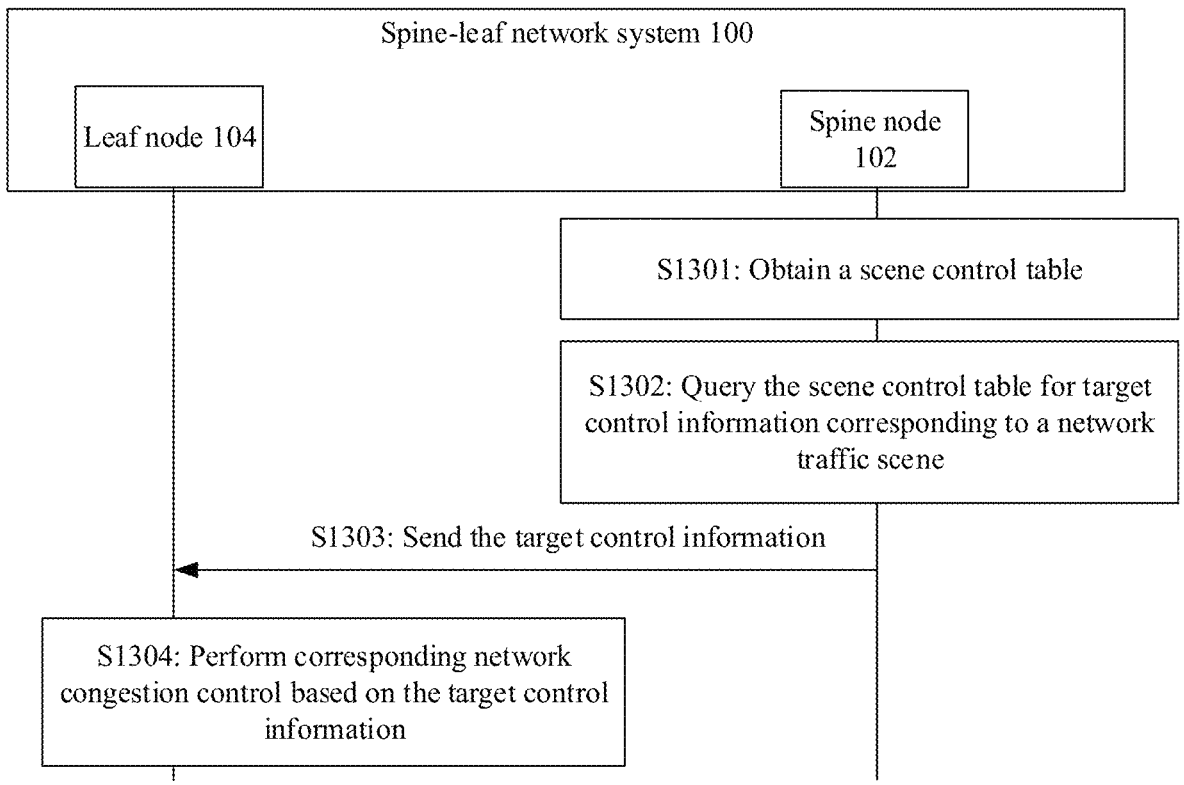
FIG. 13 is a schematic flowchart of another network congestion control method according to an embodiment of this application.

For example, step S9032 includes the following implementation steps S1301 to S1304. Details are shown in FIG. 13.

S1301. The spine node 102 obtains a scene control table, where the scene control table records a mapping relationship between a scene and congestion control information, and the mapping relationship is that one piece of congestion control information corresponds to at least one scene, and one scene corresponds to one piece of congestion control information.

In this application, the scene control table is maintained or stored in the spine node 102. Correspondingly, the spine node 102 may obtain the scene control table from a local database. The scene control table records the mapping relationship between a scene and congestion control information. Specifically, one scene corresponds to one piece of congestion control information, and one piece of congestion control information may correspond to one or more scenes. Table 2 below shows a possible scene control table.

TABLE 2

| Scene | Congestion control information. |
|---|---|
| Scene 1 | Congestion control information 1 |
| Scene 2 | Congestion control information 2 |
| Scene 3 | Congestion control information 3 |
| . . . | . . . |

S1302. The spine node 102 queries the scene control table for target control information corresponding to the network traffic scene.

S1303. The spine node 102 sends the target control information to at least one leaf node 104 in the global network topology, so that network congestion control is performed on the at least one leaf node based on the target control information. Correspondingly, the leaf node 104 receives the target control information.

S1304. The leaf node 104 performs corresponding network congestion control based on the target control information.

After obtaining the network traffic scene, the spine node 102 may obtain the target control information corresponding to the network traffic scene by querying the scene control table. Then, the spine node 102 may send the target control information to any one or more leaf nodes 104 in the global network topology. Specifically, for example, after obtaining the target control information, the spine node 102 may actively send the target control information to any one or more leaf nodes 104 in the global network topology. Optionally, the any one or more leaf nodes 104 may be a leaf node or leaf nodes whose network traffic has changed in the global network topology. For example, a difference between an inbound rate and an outbound rate of a packet queue in a leaf node 104 may cause a packet queue length of the leaf node 104 to change. In other words, network traffic of the leaf node 104 varies dynamically with time.

For another example, any leaf node 104 in the global network topology may send an information obtaining request to the spine node 102, for requesting to obtain the target control information from the spine node 102. For example, when encountering network congestion, the any leaf node 104 may actively send an information obtaining request to the spine node 102, for requesting to obtain corresponding target control information to perform network congestion control on the leaf node 104, to mitigate network congestion of the leaf node 104. Correspondingly, after receiving the information obtaining request from the leaf node 104, the spine node 102 may respond to the request and send the target control information to the leaf node 104, so that the leaf node 104 performs corresponding network congestion control on the leaf node based on the target control information.

Network congestion control in S1304 in this application relates to two specific implementation scenes, which are respectively ECN marking-based network congestion control and PFC feedback-based network congestion control. The two specific implementation scenes are separately described in detail below.

For example, the leaf node 104 performs ECN marking-based network congestion control on the leaf node 104 based on the target control information. In this scene, the foregoing network performance indicator of the leaf node 104 in this application needs to include at least a quantity of ECN marking packets transmitted by the leaf node 104 in a previous period. The scene control table in S1302 specifically records a mapping relationship between a scene and ECN marking control information. The ECN marking control information is used to indicate or determine a probability that the leaf node makes an ECN marking on a transmission packet of the leaf node 104 in a current period.

In an implementation, the ECN marking control information may be directly used to indicate a probability that the leaf node makes an ECN marking on a transmission packet in a packet queue of the leaf node 104 in the current period, and may also be referred to as an ECN marking probability. For example, Table 3 below shows a possible scene control table.

TABLE 3

| Scene | ECN marking control information (ECN marking probability) |
|---|---|
| Scene 1 | Probability 1 |
| Scene 2 | Probability 2 |
| Scene 3 | Probability 3 |
| . . . | . . . |

Correspondingly, if the ECN marking control information is represented by using an ECN marking probability, the target control information that corresponds to the network traffic scene and that is obtained by the spine node 102 from the scene control table is a target ECN marking probability, which is used to indicate the probability that the leaf node 104 makes an ECN marking on the transmission packet in the packet queue of the leaf node in the current period. Then, the leaf node 104 makes an ECN marking on the transmission packet in the packet queue of the leaf node based on the target ECN marking probability.

In another implementation, the ECN marking control information may be alternatively used to determine a probability that the leaf node makes an ECN marking on a transmission packet of the leaf node 104 in a current period, and may be specifically an ECN marking waterline shown in the embodiment of FIG. 2 and is represented by using an ECN marking parameter (Kmin, Kmax, Pmax). As shown in FIG. 2, the ECN marking waterline is used to reflect a slope by which an ECN marking probability varies with a packet queue length. The ECN marking probability is a probability that an ECN marking is made on a transmission packet in a packet queue of the leaf node 104 in the current period. The packet queue length is a length of the packet queue used by the leaf node 104 to store the transmission packet. For example, Table 4 below shows a possible scene control table that records a mapping relationship between a scene and ECN marking control information.

TABLE 4

| Scene | ECN marking control information (ECN marking parameter) |
|---|---|
| Scene 1 | (K1min, K1max, P1max) |
| Scene 2 | (K2min, K2max, P2max) |
| Scene 3 | (K3min, K3max, P3max) |
| . . . | . . . |

Correspondingly, if the ECN marking control information is represented by using an ECN marking parameter, the target control information that corresponds to the network traffic scene and that is obtained by the spine node 102 from the scene control table includes a target ECN marking parameter (KDmin, KDmax, PDmax), which is used to reflect the slope by which the ECN marking probability varies with the packet queue length of the leaf node. Correspondingly, the leaf node 104 calculates a target ECN marking probability based on the target ECN marking parameter (KDmin, KDmax, PDmax) and the packet queue length of the leaf node. For details, correspondingly refer to related descriptions in the embodiment of FIG. 2. Then, the leaf node 104 makes an ECN marking on the transmission packet in the packet queue of the leaf node based on the target ECN marking probability.

Figure 16A:
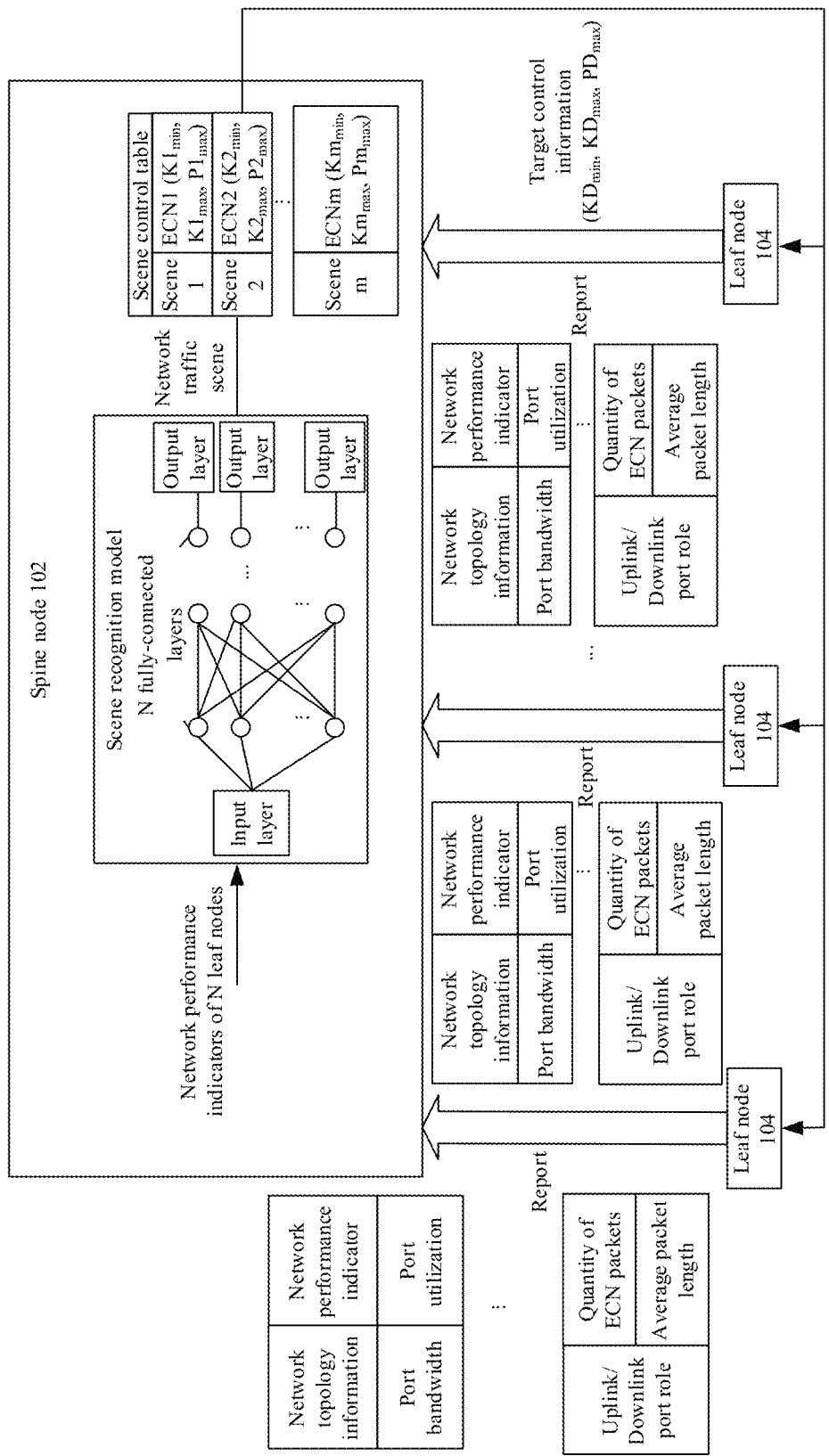
FIG. 16A and FIG. 16B are schematic diagrams of two network congestion control scenes according to an embodiment of this application.

The following uses an example in which the congestion control information is an ECN marking waterline. FIG. 16A is a schematic diagram of a possible network congestion control scene according to this application. As shown in FIG. 16A, each of N leaf nodes 104 in a spine-leaf network system 100 sends network information to a spine node 102, where the network information includes network topology information and a network performance indicator of the leaf node 104. Correspondingly, after receiving the network information of the N leaf nodes, the spine node 102 determines, based on the network topology information in the network information, that a network topology including the N leaf nodes is a global network topology of the spine-leaf network system 100. Then, the spine node 102 inputs the network performance indicators of the N leaf nodes into a scene recognition model for processing, to obtain a network traffic scene (which may be specifically an identifier ID of the network traffic scene). The spine node 102 maintains a scene control table. The scene control table records a mapping relationship between m groups of scenes and ECN marking waterlines. Details are shown in the figure. Further, the spine node 102 queries the scene control table for a target ECN waterline (KDmin, KDmax, PDmax) corresponding to the network traffic scene, and then delivers the target ECN waterline to at least one leaf node 104 of the N leaf nodes. Correspondingly, after receiving the target ECN waterline, the leaf node 104 delivers the target ECN waterline to a forwarding chip of the leaf node. Then, the forwarding chip determines a target ECN marking probability based on the target ECN waterline and a packet queue length at an egress port of the chip. For details, refer to related descriptions in the embodiment of FIG. 2. Further, the forwarding chip of the leaf node 104 makes an ECN marking on a transmission packet in a packet queue based on the target ECN marking probability, to notify a source node 106 that communicates with the leaf node 104 to stop packet transmission or reduce a packet transmission rate.

For another example, the leaf node 104 performs PFC feedback-based network congestion control on the leaf node 104 based on the target control information. In this scene, the foregoing network performance indicator of the leaf node 104 in this application needs to include at least a quantity of priority-based flow control PFC packets transmitted by the leaf node 104 in a previous period. The scene control table in S1302 specifically records a mapping relationship between a scene and PFC feedback control information. The PFC feedback control information is used to indicate or determine whether a source node that communicates with the leaf node 104 in a current period is allowed to transmit a priority packet indicated by the PFC feedback control information.

In an implementation, the PFC feedback control information is directly used to indicate whether the source node that communicates with the leaf node 104 in the current period is allowed to transmit the priority packet indicated by the PFC feedback control information. In actual application, a specific representation form of the PFC feedback control information in this application is not limited. For example, the PFC feedback control information may be represented by using a preset character string. For example, when PFC feedback control information is "13", it represents that transmission of a transmission packet whose priority is 3 and that is indicated by the PFC feedback information is allowed; when PFC feedback information is "03", it represents that transmission of a transmission packet whose priority is 3 and that is indicated by the PFC feedback information is not allowed or needs to be stopped; or the like.

Correspondingly, if the PFC feedback control information is used to indicate that transmission of the priority packet indicated by the PFC feedback control information is not allowed, the leaf node 104 may send, based on the PFC feedback control information, a first PFC notification message to all or some source nodes 106 that communicate with the leaf node 104, to notify the source nodes 106 to stop transmitting a priority packet indicated by the first PFC notification message, to mitigate network congestion of the leaf node 104.

Otherwise, if the PFC feedback control information is used to indicate that transmission of the priority packet indicated by the PFC feedback control information is allowed, the leaf node 104 may send, based on the PFC feedback control information, a second PFC notification message to all or some source nodes 106 that communicate with the leaf node 104, to notify the source nodes 106 to continue transmitting a priority packet indicated by the second PFC notification message.

In another implementation, the PFC feedback control information is used to determine whether the source node that communicates with the leaf node 104 in the current period is allowed to transmit the priority packet indicated by the PFC feedback control information. Specifically, the PFC feedback control information may be a PFC feedback waterline, which is used to reflect how a PFC notification message sent by the leaf node varies with a packet queue length. The PFC feedback waterline is represented by using a PFC feedback parameter (Xon, Xoff, Hdrm). Table 5 below shows a possible scene control table that records a mapping relationship between a scene and PFC feedback control information.

TABLE 5

| Scene | PFC feedback control information (PFC feedback parameter) |
| --- | --- |
| Scene 1 | (X1on, X1off, H1drm) |
| Scene 2 | (X2on, X2off, H2drm) |
| Scene 3 | (X3on, X3off, H3drm) |
| . . . | . . . |

Correspondingly, after the leaf node 104 obtains target PFC feedback control information corresponding to the network traffic scene, where the target PFC feedback control information includes a target PFC feedback parameter (XDon, XDoff, HDdrm), the leaf node 104 may perform network congestion control on the leaf node 104 based on the packet queue length of the leaf node and the target PFC feedback parameter (XDon, XDoff, HDdrm). Specifically, if the packet queue length of the leaf node 104 exceeds a first threshold XDoff, the leaf node 104 sends a first PFC notification message to all or some source nodes 106 that communicate with the leaf node 104. Specifically, the leaf node 104 may send the first PFC notification message in a form of an Xoff packet. The Xoff packet carries a packet priority, which is used to notify the source node 106 to stop transmitting a priority packet indicated by the first PFC notification message, to mitigate network congestion of a packet queue of the leaf node 104. HDdrm is a buffer to XDoff, and is specifically a time during which the leaf node 104 sends the first PFC notification message to the source nodes 106 that communicate with the leaf node 104. During the time, the source nodes 106 still continue to send a corresponding priority packet to the leaf node 104.

When the packet queue length of the leaf node 104 is less than or equal to a second threshold XDon, the leaf node 104 sends a second PFC notification message to all or some source nodes 106 that communicate with the leaf node 104. Specifically, the leaf node 104 may send the second PFC notification message in a form of an Xon packet. The Xon packet carries a packet priority, to notify the source nodes 106 to continue transmitting a priority packet indicated by the second PFC notification message.

It should be noted that, considering a calculation workload of a node, in the spine-leaf network system 100 in this application, network congestion control may be performed in a periodic processing manner. For example, in S901, any leaf node 104 in the spine-leaf network system 100 may periodically collect and report network information that includes network topology information and a network performance indicator of the leaf node 104, and then send the network information to the spine node 102 for processing, so that network congestion control is performed on the leaf node 104. Duration of each period may be a custom setting of the system, for example, 1s or 5s.

Figure 14:
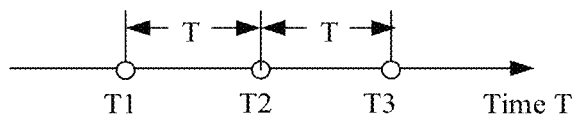
FIG. 14 is a schematic flowchart of another network congestion control method according to an embodiment of this application.

In actual application, in the spine-leaf network system 100, network congestion control may be performed on a leaf node 104 in a current period by using network information of the leaf node 104 in a previous period. For example, FIG. 14 is a schematic diagram of an information collection scene. As shown in FIG. 14, it is assumed that duration of each period is T. As shown in the figure, a leaf node 104 starts collecting network topology information and a network performance indicator of the leaf node 104 at a moment T1, and subsequently collects and reports network topology information and a network performance indicator of the leaf node 104 at an interval of T. The leaf node 104 may send, to the spine node 102 as information data of a previous period, the network topology information and network performance indicator collected at the moment T1, so that the spine node 102 performs network congestion control on any leaf node 104 in a current period (that is, any moment after the moment T1 and before a moment T2) based on the network topology information and the network performance indicator of each leaf node 104 in the previous period.

Figure 15:
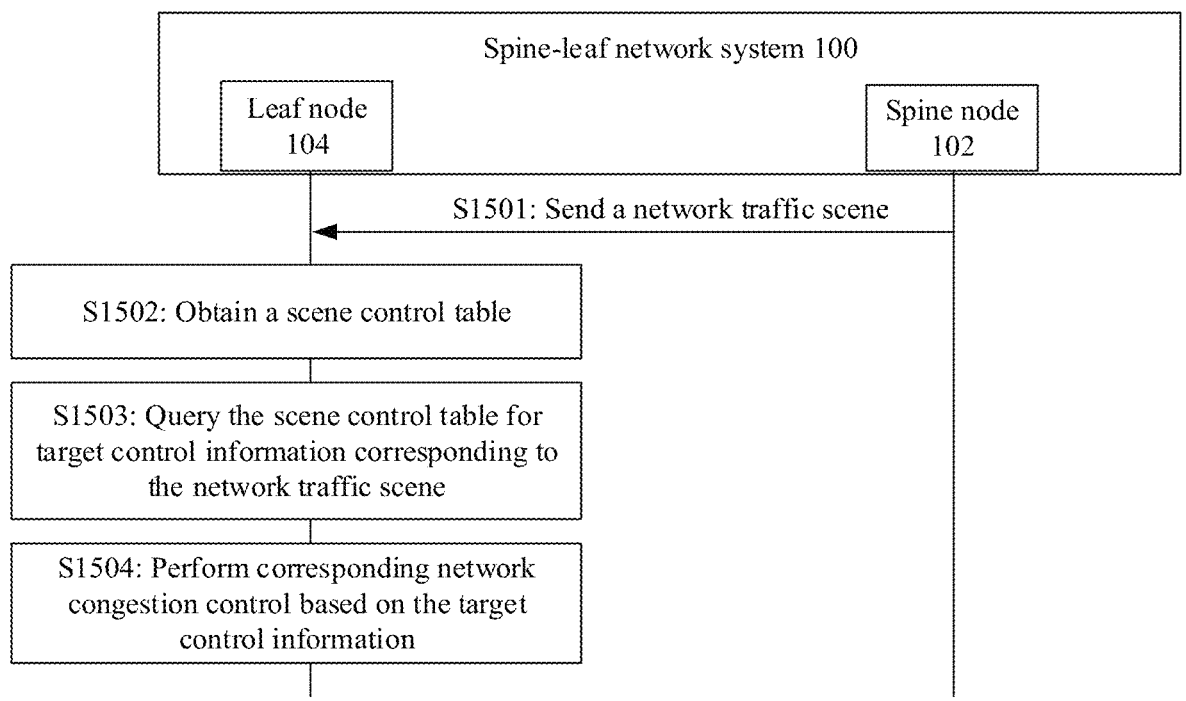
FIG. 15 is a schematic flowchart of another network congestion control method according to an embodiment of this application.

For another example, step S9032 includes the following implementation steps S1501 to S1504. Details are shown in FIG. 15.

S1501. The spine node 102 sends the network traffic scene to any one or more leaf nodes 104 in the global network topology. Correspondingly, the leaf node 104 or leaf nodes 104 receive the network traffic scene.

In this application, a scene control table is maintained in a single leaf node 104. Then, after obtaining the network traffic scene in S9031, the spine node 102 may deliver the network traffic scene to any one or more leaf nodes 104 in the global network topology. Correspondingly, the one or more leaf nodes 104 may perform corresponding network congestion control based on the network traffic scene. The following provides detailed descriptions by using one leaf node 104 as an example in this application. Scene control tables respectively maintained in leaf nodes 104 may be the same or may be different. This is not limited.

S1502. The leaf node 104 obtains the scene control table, where the scene control table records a mapping relationship between a scene and congestion control information, and the mapping relationship is that one piece of congestion control information corresponds to at least one scene, and one scene corresponds to one piece of congestion control information.

S1503. The leaf node 104 queries the scene control table for target control information corresponding to the network traffic scene.

S1504. The leaf node 104 performs network congestion control based on the target control information.

The leaf node 104 may obtain the scene control table from a local database, query the scene control table for the target control information corresponding to the network traffic scene, and perform network congestion control on the leaf node 104 based on the target control information. Specifically, the leaf node 104 may deliver the target control information to an egress port of a forwarding chip of the node, so that network congestion control is performed on an egress port of the leaf node 104. For content that is not shown or described in this application, refer to content described in the embodiment of FIG. 13. Details are not described herein again.

Figure 16B:
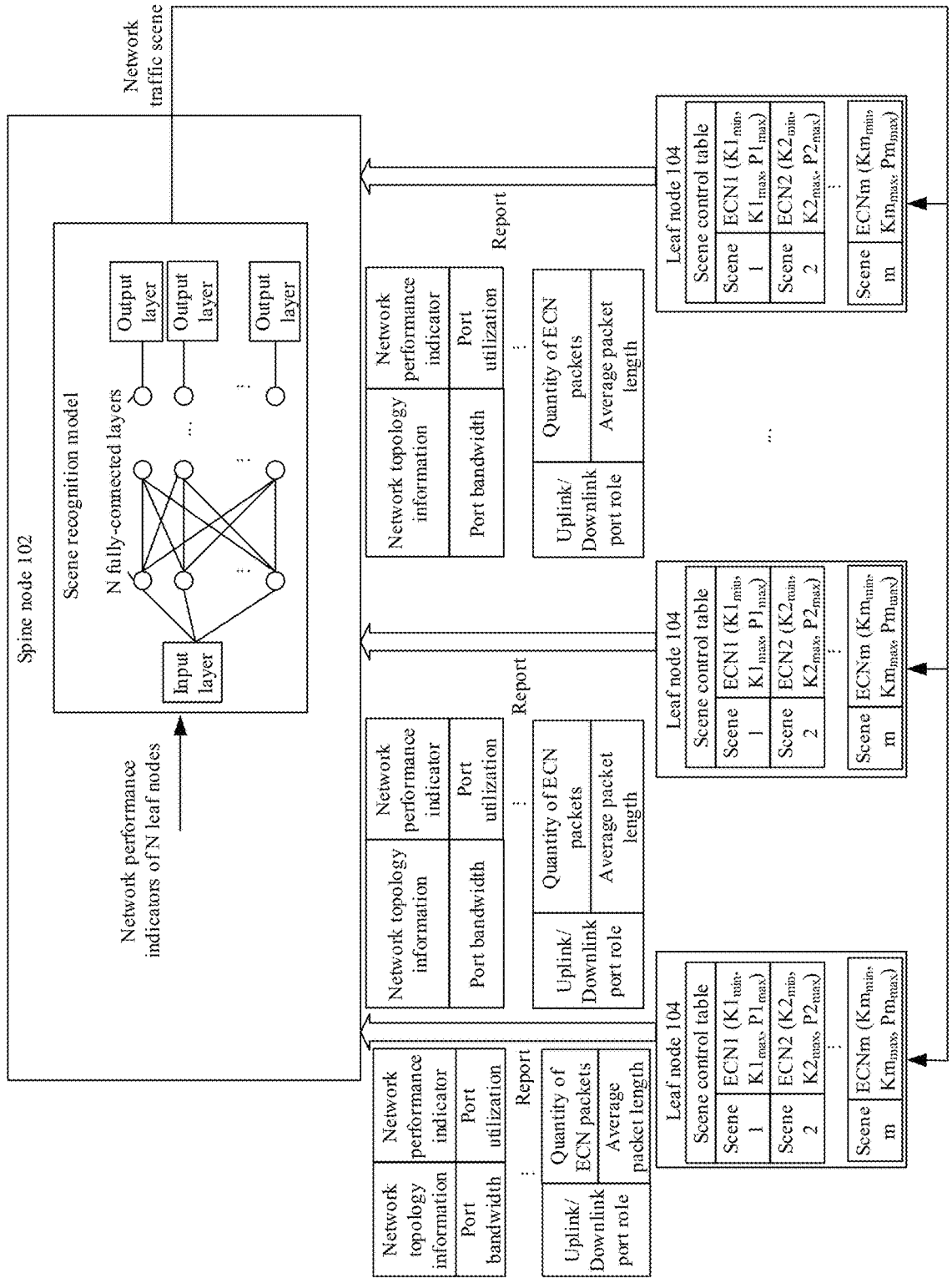

The following uses an example in which the congestion control information is an ECN marking waterline. FIG. 16B is a schematic diagram of a possible network congestion control scene according to this application. With reference to related descriptions of FIG. 16A, after obtaining a network traffic scene through calculation, a spine node 102 may deliver the network traffic scene to at least one leaf node 104 of N leaf nodes. A scene control table is maintained in each leaf node 104. The scene control table records a mapping relationship between m groups of scenes and ECN marking waterlines. For example, in the figure, a scene i corresponds to an ECN marking waterline i (which is abbreviated as ECNi in the figure).

Correspondingly, after receiving the network traffic scene, the leaf node 104 may query the scene control table for a target ECN marking waterline (KDmin, KDmax, PDmax) corresponding to the network traffic scene. With reference to the descriptions in the embodiment of FIG. 2, the leaf node 104 determines a target ECN marking probability by using a forwarding chip based on the target ECN marking waterline and a packet queue length at an egress port of the chip; and then makes an ECN marking on a transmission packet in a packet queue based on the target ECN marking probability, to notify a source node 106 that communicates with the leaf node 104 to stop packet transmission or reduce a packet transmission rate.

By implementing the embodiments of this application, network congestion control can be performed, based on the network performance indicator of each leaf node in the spine-leaf network system, on a leaf node whose network traffic changes dynamically. This not only can resolve the problem in the conventional technology that network performance requirements such as a low latency and a high throughput cannot be met because network traffic changes dynamically, and can also provide a specific generalization capability concerning system networking changes, thereby supporting changes of a system network topology. Especially in a data storage service, this solution can effectively improve data storage performance.

Figure 17:
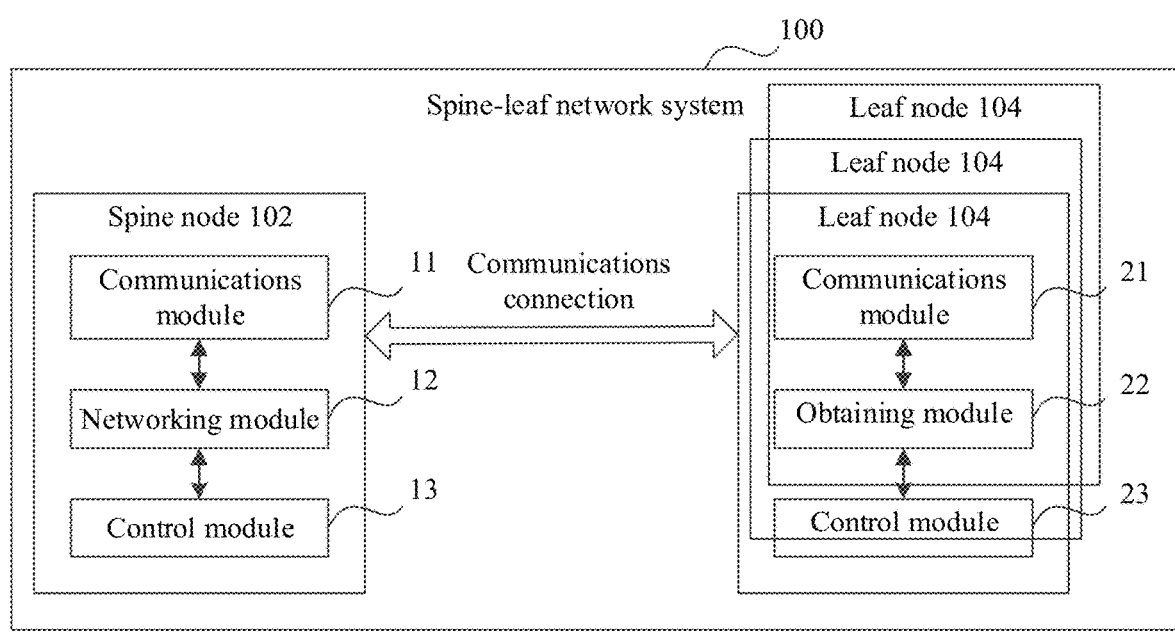
FIG. 17 is a schematic diagram of a structure of another spine-leaf network system according to an embodiment of this application.

Based on related descriptions in the foregoing embodiments, the following describes a related apparatus and system to which this application applies. FIG. 17 is a schematic diagram of a structure of a spine-leaf network system 100 according to an embodiment of this application.

The spine-leaf network system 100 shown in FIG. 17 includes a spine node 102 and at least one leaf node 104. As shown in FIG. 17, the spine node 102 includes a communication module 11, a networking module 12, and a control module 13. The leaf node 104 includes a communication module 21 and a control module 23. Optionally, the leaf node 104 further includes an obtaining module 22. Details are as follows.

The communication module 11 is configured to receive network information sent by the at least one leaf node 104, where the network information includes network topology information of the leaf node and a network performance indicator of the leaf node.

The networking module 12 is configured to network the at least one leaf node and the spine node based on the network topology information of the at least one leaf node, to obtain a combined network topology.

The control module 13 is configured to: if the combined network topology is a global network topology of the spine-leaf network system, perform network congestion control on the at least one leaf node based on the network performance indicator of the at least one leaf node.

In actual application, the communication module 11 in this application may specifically include function modules such as the information receiving module 1021 and the information sending module 1025 shown in FIG. 8. In other words, the communication module 11 may be specifically implemented by the function modules such as the information receiving module 1021 and the information sending module 1025. The networking module 12 may be specifically implemented by the topology networking module 1022 shown in FIG. 8. The control module 13 may specifically include function modules such as the information processing module 1023 and the scene recognition module 1024 shown in FIG. 8. In other words, the control module 13 is specifically implemented by the function modules such as the information processing module 1023 and the scene recognition module 1024 shown in FIG. 8.

In some possible embodiments, the control module 13 is specifically configured to: call a scene recognition model to process a target performance indicator, to obtain a network traffic scene corresponding to the at least one leaf node, where the target performance indicator is the network performance indicator of the at least one leaf node or a network performance indicator obtained by preprocessing the network performance indicator of the at least one leaf node, and the scene recognition model is obtained through training in advance based on an initial performance indicator and an initial traffic scene of each node in the spine-leaf network system; and perform network congestion control on the at least one leaf node based on the network traffic scene.

In some possible embodiments, the control module 13 is specifically configured to: obtain a scene control table, where the scene control table records a mapping relationship between a scene and congestion control information, and the mapping relationship is that the congestion control information corresponds to at least one scene; query the scene control table for target control information corresponding to the network traffic scene; and send the target control information to the at least one leaf node 104, so that the control module 23 of the leaf node 104 performs network congestion control on the at least one leaf node 104 based on the target control information.

In some possible embodiments, the control module 13 is specifically configured to call the communication module 11 to send the network traffic scene to the at least one leaf node 104. Correspondingly, the communication module 21 of the at least one leaf node 104 receives the network traffic scene. The obtaining module 22 of the at least one leaf node 104 is configured to obtain a scene control table, where the scene control table records a mapping relationship between a scene and congestion control information, and the mapping relationship is that the congestion control information corresponds to at least one scene; and query the scene control table for target control information corresponding to the network traffic scene. The control module 23 of the at least one leaf node 104 is configured to perform network congestion control on the at least one leaf node based on the target control information.

In some possible embodiments, the target control information includes a target ECN marking parameter, which is used to reflect a slope by which an ECN marking probability varies with a packet queue length, the ECN marking probability is a probability that an ECN marking is made on a transmission packet in a packet queue of the leaf node, and the packet queue length is a length of the packet queue of the leaf node. The control module 23 of the at least one leaf node 104 is specifically configured to calculate a corresponding ECN marking probability based on the target ECN marking parameter and a length of a packet queue of each of the at least one leaf node; and make an ECN marking on the transmission packet in the packet queue of the at least one leaf node based on the corresponding ECN marking probability, to notify a source node that communicates with the leaf node to reduce a packet transmission rate or stop packet transmission.

In some possible embodiments, if the network performance indicator includes a quantity of explicit congestion notification ECN marking packets transmitted by the leaf node in a previous period, the target control information includes an ECN marking probability, which is used to indicate a probability that an ECN marking is made on a transmission packet in a packet queue of the leaf node. The control module 23 of the at least one leaf node 104 is specifically configured to make an ECN marking on the transmission packet in the packet queue of the at least one leaf node based on the ECN marking probability of the at least one leaf node, to notify a source node that communicates with the at least one leaf node to reduce a packet transmission rate or stop packet transmission.

In some possible embodiments, if the network performance indicator includes a quantity of priority-based flow control PFC packets transmitted by the leaf node in a previous period, the target control information includes a target PFC feedback parameter, which is used to reflect how a PFC notification message sent by the leaf node varies with a length of a packet queue of the leaf node. The control module 23 of the at least one leaf node 104 is specifically configured to: if the length of the packet queue of the at least one leaf node is greater than or equal to a first threshold in the target PFC feedback parameter, call the communication module 21 of the at least one leaf node 104 to send a first PFC notification message to a source node that communicates with the at least one leaf node, to notify the source node to stop transmitting a priority packet indicated by the first PFC notification message; or if the length of the packet queue of the at least one leaf node is less than or equal to a second threshold in the target PFC feedback parameter, call the communication module 21 of the at least one leaf node 104 to send a second PFC notification message to a source node that communicates with the at least one leaf node, to notify the source node to continue transmitting a priority packet indicated by the second PFC notification message.

In some possible embodiments, if the network performance indicator includes a quantity of priority-based flow control PFC packets transmitted by the leaf node in a previous period, the target control information is PFC feedback control information, which is used to indicate whether a source node that communicates with the leaf node is allowed to transmit a priority packet indicated by the PFC feedback control information. The control module 23 of the at least one leaf node 104 is specifically configured to: if the PFC feedback control information is used to indicate that transmission of the priority packet indicated by the PFC feedback control information is not allowed, call the communication module 21 of the at least one leaf node 104 to send a first PFC notification message to a source node that communicates with the at least one leaf node, where the first PFC notification message is used to notify the source node to stop transmitting a priority packet indicated by the first PFC notification message; or if the PFC feedback control information is used to indicate that transmission of the priority packet indicated by the PFC feedback control information is allowed, call the communication module 21 of the at least one leaf node 104 to send a second PFC notification message to a source node that communicates with the at least one leaf node, where the second PFC notification message is used to notify the source node that the source node is allowed to transmit a priority packet indicated by the second PFC notification message.

In some possible embodiments, the network topology information is used to indicate that a neighboring node exists in a communication radius of the leaf node. The control module 13 is further configured to: determine, based on the network topology information of the at least one leaf node and network topology information of the spine node, whether all neighboring nodes of each node in the spine-leaf network system are located in the combined network topology; and when all the neighboring nodes of each node are located in the combined network topology, determine that the combined network topology is the global network topology of the spine-leaf network system.

It should be understood that a node in this embodiment of this application may be implemented by using an application-specific integrated circuit (ASIC), or may be implemented by using a programmable logic device (PLD). The PLD may be a complex programmable logic device (CPLD), a field-programmable gate array (FPGA), generic array logic (GAL), or any combination thereof. Alternatively, related descriptions in the foregoing method embodiment may be implemented by using software, and the modules in the node may also be software units.

It should be noted that FIG. 17 is merely a possible implementation of this embodiment of this application. In actual application, each node in the spine-leaf network system may alternatively include more or fewer parts. This is not limited herein. For content that is not shown or not described in this embodiment of this application, refer to related descriptions in the embodiments of FIG. 1 to FIG. 16B. Details are not described herein again.

Figure 18:
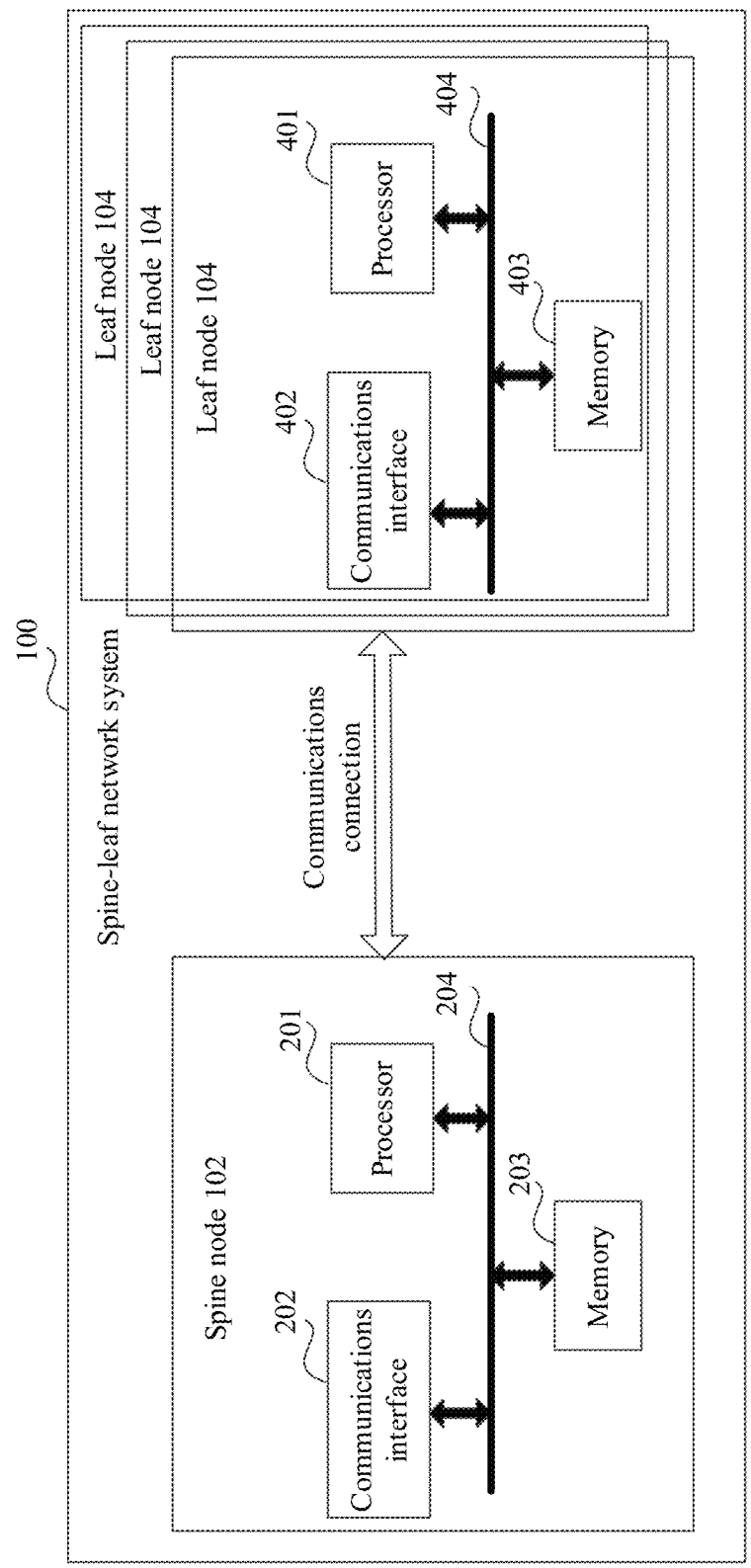
FIG. 18 is a schematic diagram of a structure of another spine-leaf network system according to an embodiment of this application.

FIG. 18 is a schematic diagram of a structure of another spine-leaf network system 100 according to an embodiment of this application. The spine-leaf network system 100 shown in FIG. 18 includes a spine node 102 and at least one leaf node 104. The spine node 102 includes one or more processors 201, a communication interface 202, and a memory 203. The processor or processors 201, the communication interface 202, and the memory 203 may be connected by using a bus, or may implement communication by using wireless transmission or other means. As an example in this embodiment of this application, the processor or processors 201, the communication interface 202, and the memory 203 are connected by using a bus 204. The memory 203 is configured to store instructions. The processor 201 is configured to execute the instructions stored in the memory 203. The memory 203 stores program code, and the processor 201 may invoke the program code stored in the memory 203 to perform the following operations:

receiving network information sent by the at least one leaf node 104, where the network information includes network topology information of the leaf node 104 and a network performance indicator of the leaf node;

networking the at least one leaf node 104 and the spine node 102 based on the network topology information of the at least one leaf node 104, to obtain a combined network topology; and if the combined network topology is a global network topology of the spine-leaf network system, performing network congestion control on the at least one leaf node 104 based on the network performance indicator of the at least one leaf node 104.

Optionally, the processor 201 in this embodiment of this application may call the program code stored in the memory 203 to perform all or some steps that are described from a perspective in which the spine node 102 is an execution body in any embodiment of FIG. 1 to FIG. 17, or perform other content described in this specification. Details are not described herein again.

It should be understood that the processor 201 may include one or more general-purpose processors, for example, one or more central processing units (CPUs). The processor 201 may be configured to run a program of the following function modules in related program code. The function modules may specifically include but are not limited to any one or combination of a plurality of function modules such as the communication module 11, the networking module 12, the control module 13, the information receiving module 1021, the topology networking module 1022, the information processing module 1023, the scene recognition module 1024, and the information sending module 1025 described above. In other words, the processor 201 may execute the program code to perform functions of any one or more of the foregoing function modules. For details about the function modules mentioned herein, refer to related descriptions in the foregoing embodiments. Details are not described herein again.

The communication interface 202 may be a wired interface (for example, an ethernet interface) or a wireless interface (for example, a cellular network interface or a wireless local area network interface), and is configured to communicate with another unit/device. For example, the communication interface 202 in this embodiment of this application may be specifically configured to receive the network information sent by the leaf node 104, or the like.

The memory 203 may include a volatile memory, for example, a random access memory (RAM). The memory may alternatively include a non-volatile memory, for example, a read-only memory (ROM), a flash memory, a hard disk drive (HDD), or a solid-state drive (SSD). Alternatively, the memory 203 may include a combination of the foregoing types of memories. The memory 203 may be configured to store a group of program code. The processor 201 calls the program code stored in the memory 203 to implement the functions of the foregoing function modules in the embodiments of this application, or implement technical content that is recorded from a perspective in which the spine node 102 is an execution body in any method embodiment of FIG. 1 to FIG. 17 in this application.

Correspondingly, any leaf node 104 includes one or more processors 401, a communication interface 402, and a memory 403. The processor 401, the communication interface 402, and the memory 403 may be connected by using a bus, or may implement communication by using wireless transmission or other means. As an example in this embodiment of this application, the processor or processors 401, the communication interface 402, and the memory 403 are connected by using a bus 404. The memory 403 is configured to store instructions. The processor 401 is configured to execute the instructions stored in the memory 403. The memory 403 stores program code, and the processor 401 may invoke the program code stored in the memory 403 to perform the following operations:

sending network information of the leaf node 104 to the spine node 102, where the network information includes network topology information of the leaf node and a network performance indicator of the leaf node; and performing network congestion control on the at least one leaf node based on target control information, where the target control information is delivered by the spine node 102 after processing the network information of the at least one leaf node 104, or the target control information is obtained by querying a scene control table based on a network traffic scene delivered by the spine node 102, the scene control table records a mapping relationship between a scene and congestion control information, and the mapping relationship is that one piece of congestion control information corresponds to at least one scene.

Optionally, the processor 401 in this embodiment of this application may call the program code stored in the memory 403 to perform all or some steps that are described from a perspective in which the leaf node 104 is an execution body in any method embodiment of FIG. 1 to FIG. 17, or perform other content described in this specification. Details are not described herein again.

It should be understood that the processor 401 may include one or more general-purpose processors, for example, one or more central processing units (CPUs). The processor 401 may be configured to run a program of the following function modules in related program code. The function modules may specifically include but are not limited any one or combination of a plurality of function modules such as the communication module 21, the obtaining module 22, the control module 23, the topology collection module 1041, the topology processing module 1042, the indicator collection module 1043, the indicator processing module 1044, the information sending module 1045, the information receiving module 1046, the information processing module 1047, and the control delivery module 1048 described above. In other words, the processor 401 may execute the program code to perform functions of any one or more of the foregoing function modules. For details about the function modules mentioned herein, refer to related descriptions in the foregoing embodiments. Details are not described herein again.

The communication interface 402 may be a wired interface (for example, an ethernet interface) or a wireless interface (for example, a cellular network interface or a wireless local area network interface), and is configured to communicate with another unit/device. For example, the communication interface 402 in this embodiment of this application may be specifically configured to receive the target control information, the network traffic scene, or the like sent by the spine node 102.

The memory 403 may include a volatile memory, for example, a random access memory (RAM). The memory may alternatively include a non-volatile memory, for example, a read-only memory (ROM), a flash memory, a hard disk drive (HDD), or a solid-state drive (SSD). Alternatively, the memory 403 may include a combination of the foregoing types of memories. The memory 403 may be configured to store a group of program code. The processor 401 calls the program code stored in the memory 403 to implement the functions of the foregoing function modules in the embodiments of this application, or implement technical content that is recorded from a perspective in which the leaf node 104 is an execution body in any method embodiment of FIG. 1 to FIG. 17 in this application.

It should be noted that FIG. 18 is merely a possible implementation of this embodiment of this application. In actual application, each node in the spine-leaf network system may alternatively include more or fewer parts. This is not limited herein. For content that is not shown or not described in this embodiment of this application, refer to related descriptions in the embodiments of FIG. 1 to FIG. 17. Details are not described herein again.

An embodiment of this application further provides a computer non-transitory storage medium. The computer non-transitory storage medium stores instructions. When the instructions are run on a processor, the method process described in the method embodiment shown in any one of FIG. 9, FIG. 13, and FIG. 15 is implemented.

An embodiment of this application further provides a computer program product. When the computer program product runs on a processor, the method process described in the method embodiment shown in any one of FIG. 9, FIG. 13, and FIG. 15 is implemented.

Methods or algorithm steps described with reference to the content disclosed in the embodiments of this application may be implemented by hardware, or may be implemented by a processor by executing software instructions. The software instructions may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk drive, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a node. Certainly, the processor and the storage medium may exist in a node device as discrete components.

A person of ordinary skill in the art may understand that all or some of processes of the methods in the embodiments may be implemented by a computer program instructing related hardware. The program may be stored in a computer-readable storage medium. When the program is executed, the processes of the foregoing method embodiments may be included. The foregoing storage medium includes any medium that can store program code, for example, a ROM, a RAM, a magnetic disk, or a compact disc.

What is claimed is:

1. A network congestion control method, applied to a spine-leaf network system, wherein the spine-leaf network system comprises a spine node and at least one leaf node that communicates with the spine node, and the method comprises:
   receiving, by the spine node, network information sent by the at least one leaf node, wherein the network information comprises network topology information of the at least one leaf node and a network performance indicator of the at least one leaf node;
   networking the at least one leaf node and the spine node based on the network topology information of the at least one leaf node, to obtain a combined network topology, wherein
   the combined network topology is a global network topology of the spine-leaf network system;
   calling a scene recognition model to process a target performance indicator, to obtain a network traffic scene corresponding to the at least one leaf node, wherein the target performance indicator is the network performance indicator of the at least one leaf node or a network performance indicator obtained by preprocessing the network performance indicator of the at least one leaf node, and the scene recognition model is obtained through training in advance based on an initial performance indicator and an initial traffic scene of each node in the spine-leaf network system;
   obtaining a scene control table, wherein the scene control table records a mapping relationship between a scene and congestion control information, and the mapping relationship is that the congestion control information corresponds to at least one scene;
   querying the scene control table for target control information corresponding to the network traffic scene; and
   performing network congestion control on the at least one leaf node based on the network target control information.

2. The method according to claim 1, further including
   sending the target control information to the at least one leaf node.

3. The method according to claim 1, further including
   sending, by the spine node, the network traffic scene to the at least one leaf node;
   wherein the obtaining the scene control table,
   the querying the scene control table, and
   the performing network congestion control on the at least one leaf node based on the target control information are performed by the at least one leaf node.

4. The method according to claim 1, wherein based on the network performance indicator comprising a quantity of explicit congestion notification (ECN) marking packets transmitted by the leaf node in a previous period, the target control information comprises a target ECN marking parameter, which is used to reflect a slope by which an ECN marking probability varies with a packet queue length, the ECN marking probability is a probability that an ECN marking is made on a transmission packet in a packet queue of the leaf node, and the packet queue length is a length of the packet queue of the leaf node; and
   the performing network congestion control on the at least one leaf node based on the target control information comprises:
   obtaining, by the at least one leaf node through calculation based on the target ECN marking parameter and a length of a packet queue of each of the at least one leaf node, a target ECN marking probability corresponding to the at least one leaf node; and making, by the at least one leaf node, an ECN marking on the transmission packet in the packet queue of the at least one leaf node based on the corresponding target ECN marking probability, to notify a source node that communicates with the leaf node to reduce a packet transmission rate or stop packet transmission.

5. The method according to claim 1, wherein based on the network performance indicator comprising a quantity of explicit congestion notification (ECN) marking packets transmitted by the leaf node in a previous period, the target control information comprises a target ECN marking probability, which is used to indicate a probability that an ECN marking is made on a transmission packet in a packet queue of the leaf node; and the performing network congestion control on the at least one leaf node based on the target control information comprises:

making, by the at least one leaf node, an ECN marking on the transmission packet in the packet queue of the at least one leaf node based on the target ECN marking probability corresponding to the at least one leaf node, to notify a source node that communicates with the at least one leaf node to reduce a packet transmission rate or stop packet transmission.

6. The method according to claim 1, wherein based on the network performance indicator comprising a quantity of priority-based flow control (PFC) packets transmitted by the leaf node in a previous period, the target control information comprises a target PFC feedback parameter, which is used to reflect how a PFC notification message sent by the leaf node varies with a length of a packet queue of the leaf node; and the performing network congestion control on the at least one leaf node based on the target control information comprises:

based on the length of the packet queue of the at least one leaf node being greater than or equal to a first parameter threshold in the target PFC feedback parameter, sending, by the at least one leaf node, a first PFC notification message to a source node that communicates with the at least one leaf node, to notify the source node to stop transmitting a priority packet indicated by the first PFC notification message; or based on the length of the packet queue of the at least one leaf node being less than or equal to a second parameter threshold in the target PFC feedback parameter, sending, by the at least one leaf node, a second PFC notification message to a source node that communicates with the at least one leaf node, to notify the source node to continue transmitting a priority packet indicated by the second PFC notification message.

7. The method according to claim 1, wherein based on the network performance indicator comprising a quantity of priority-based flow control (PFC) packets transmitted by the leaf node in a previous period, the target control information is PFC feedback control information, which is used to indicate whether a source node that communicates with the leaf node is allowed to transmit a priority packet indicated by the PFC feedback control information; and the performing network congestion control on the at least one leaf node based on the target congestion control information comprises:

based on the PFC feedback control information being used to indicate that transmission of the priority packet indicated by the PFC feedback control information is not allowed, sending, by the at least one leaf node, a first PFC notification message to the source node that communicates with the at least one leaf node, wherein the first PFC notification message is used to notify the source node to stop transmitting a priority packet indicated by the first PFC notification message; or based on the PFC feedback control information being used to indicate that transmission of the priority packet indicated by the PFC feedback control information is allowed, sending, by the at least one leaf node, a second PFC notification message to the source node that communicates with the at least one leaf node, wherein the second PFC notification message is used to notify the source node that the source node is allowed to transmit a priority packet indicated by the second PFC notification message.

8. The method according to claim 1, wherein the network topology information is used to indicate that a neighboring node exists in a communication radius of the leaf node, and before the performing network congestion control on the at least one leaf node based on the network performance indicator of the at least one leaf node, the method further comprises:

determining, based on the network topology information of the at least one leaf node and network topology information of the spine node, whether all neighboring nodes of each node in the spine-leaf network system are located in the combined network topology; and based on all the neighboring nodes of each node being located in the combined network topology, determining that the combined network topology is the global network topology of the spine-leaf network system.

9. A spine node, comprising:

at least one processor; and one or more memories coupled to the at least one processor and storing instructions for execution by the at least one processor, wherein execution of the instructions by the at least one processor cause the spine node to:

receive network information sent by at least one leaf node, wherein the network information comprises network topology information of the at least one leaf node and a network performance indicator of the at least one leaf node;

network the at least one leaf node and the spine node based on the network topology information of the at least one leaf node, to obtain a combined network topology, wherein the combined network topology is a global network topology of a spine-leaf network system;

call a scene recognition model to process a target performance indicator, to obtain a network traffic scene corresponding to the at least one leaf node, wherein the target performance indicator is the network performance indicator of the at least one leaf node or a network performance indicator obtained by preprocessing the network performance indicator of the at least one leaf node, and the scene recognition model is obtained through training in advance based on an initial performance indicator and an initial traffic scene of each node in the spine-leaf network system; and perform network congestion control on the at least one leaf node based on the network traffic scene;

obtain a scene control table, wherein the scene control table records a mapping relationship between a scene and congestion control information, and the mapping relationship is that the congestion control information corresponds to at least one scene;

query the scene control table for target control information corresponding to the network traffic scene; and perform network congestion control on the at least one leaf node based on the target control information.

11. The spine node according to claim 9, wherein execution of the instructions by the at least one processor further cause the spine node to: send the target control information to the at least one leaf node.

11. The spine node according to claim 9, wherein execution of the instructions by the at least one processor further cause the spine node to: call the communication module to send the network traffic scene to the at least one leaf node, so that the at least one leaf node: obtains a scene control table, queries the scene control table for target control information corresponding to the network traffic scene, and performs network congestion control on the at least one leaf node based on the target control information.

12. A spine-leaf network system, comprising a spine node and at least one leaf node that communicates with the spine node, wherein the at least one leaf node is configured to send network information of the at least one leaf node to the spine node, wherein the network information of the at least one leaf node comprises network topology information of the at least one leaf node and a network performance indicator of the at least one leaf node; and the spine node is configured to:

receive the network information sent by the at least one leaf node, network the at least one leaf node and the spine node based on the network topology information of the at least one leaf node, to obtain a combined network topology, wherein the combined network topology is a global network topology of the spine-leaf network system;

call a scene recognition model to process a target performance indicator, to obtain a network traffic scene corresponding to the at least one leaf node, wherein the target performance indicator is the network performance indicator of the at least one leaf node or a network performance indicator obtained by preprocessing the network performance indicator of the at least one leaf node, and the scene recognition model is obtained through training in advance based on an initial performance indicator and an initial traffic scene of each node in the spine-leaf network system;

obtain a scene control table, wherein the scene control table records a mapping relationship between a scene and congestion control information, and the mapping relationship is that the congestion control information corresponds to at least one scene;

query the scene control table for target control information corresponding to the network traffic scene; and perform network congestion control on the at least one leaf node based on the target control information.

* * * * *